United States Patent
Lotz et al.

(10) Patent No.: US 12,084,624 B2
(45) Date of Patent: Sep. 10, 2024

(54) ALKYLATED AROMATIC COMPOUNDS FOR HIGH VISCOSITY APPLICATIONS

(71) Applicant: ExxonMobil Chemical Patents Inc., Baytown, TX (US)

(72) Inventors: Monica D. Lotz, Houston, TX (US); Kyle G. Lewis, Houston, TX (US); Christine M Henry, Seabrook, TX (US); Craig J. Emett, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 17/997,795

(22) PCT Filed: May 10, 2021

(86) PCT No.: PCT/US2021/031589
§ 371 (c)(1),
(2) Date: Nov. 2, 2022

(87) PCT Pub. No.: WO2021/231303
PCT Pub. Date: Nov. 18, 2021

(65) Prior Publication Data
US 2023/0227746 A1 Jul. 20, 2023

Related U.S. Application Data

(60) Provisional application No. 63/024,072, filed on May 13, 2020.

(30) Foreign Application Priority Data

Jul. 28, 2020 (EP) .................................... 20188253

(51) Int. Cl.
*C10M 107/02* (2006.01)
*C08F 8/00* (2006.01)
(Continued)

(52) U.S. Cl.
CPC ............. *C10M 107/02* (2013.01); *C08F 8/00* (2013.01); *C08F 10/00* (2013.01); *C10M 105/06* (2013.01);
(Continued)

(58) Field of Classification Search
CPC ......... C08F 8/00; C08F 10/00; C10M 105/06; C10M 107/02; C10M 127/04;
(Continued)

(56) References Cited

U.S. PATENT DOCUMENTS 3,036,003 A 5/1962 Arthur
3,172,892 A 3/1965 Le et al.
(Continued)

FOREIGN PATENT DOCUMENTS

EP 1040115 A1 10/2000
WO 99/31113 A1 6/1999
(Continued)

OTHER PUBLICATIONS

Extended European Search Report received for European Patent Application No. 20188253.7, mailed on Oct. 5, 2020, 7 Pages.
(Continued)

*Primary Examiner* — James C Goloboy

(57) ABSTRACT

The present disclosure generally relates to alkylated aromatic compounds useful as basestocks and additives for high viscosity applications. In an embodiment is provided an alkylated aromatic compound. In another embodiment is provided a lubricant formulation that includes an alkylated aromatic compound. In another embodiment is provided a lubricant formulation that includes an alkylated aromatic compound, an additive, and optionally, a Group III basestock, Group IV basestock, Group V basestock, or a combination thereof, the Group V basestock being different than the alkylated aromatic compound. In another embodiment is
(Continued)

provided a method of forming a lubricant formulation that includes introducing a mPAO, an aromatic compound, and an acid catalyst to a reactor under reactor conditions to form an alkylated aromatic compound; and introducing the alkylated aromatic compound to an additive to form a lubricant formulation.

27 Claims, 3 Drawing Sheets

(51) Int. Cl.
| | |
|---|---|
| *C08F 10/00* | (2006.01) |
| *C10M 105/06* | (2006.01) |
| *C10M 127/04* | (2006.01) |
| *C10N 20/02* | (2006.01) |
| *C10N 30/02* | (2006.01) |
| *C10N 30/10* | (2006.01) |
| *C10N 40/00* | (2006.01) |
| *C10N 40/04* | (2006.01) |
| *C10N 40/08* | (2006.01) |
| *C10N 40/25* | (2006.01) |
| *C10N 40/30* | (2006.01) |
| *C10N 50/10* | (2006.01) |

(52) U.S. Cl.
CPC ...... *C10M 127/04* (2013.01); *C10M 2203/06* (2013.01); *C10M 2203/065* (2013.01); *C10M 2205/0206* (2013.01); *C10N 2020/02* (2013.01); *C10N 2030/02* (2013.01); *C10N 2030/10* (2013.01); *C10N 2040/04* (2013.01); *C10N 2040/08* (2013.01); *C10N 2040/25* (2013.01); *C10N 2040/30* (2013.01); *C10N 2040/40* (2020.05); *C10N 2050/10* (2013.01)

(58) Field of Classification Search
CPC ........ C10M 2203/06; C10M 2203/065; C10M 2205/0206; C10M 2020/02; C10M 2030/02; C10M 2030/10; C10M 2040/04; C10M 2040/08; C10M 2040/25; C10M 2040/30; C10M 2040/40; C10M 2050/10
See application file for complete search history.

(56) References Cited

U.S. PATENT DOCUMENTS

| | | | |
|---|---|---|---|
| 3,219,666 | A | 11/1965 | Le et al. |
| 3,316,177 | A | 4/1967 | Dorer, Jr. |
| 4,234,435 | A | 11/1980 | Meinhardt et al. |
| 4,889,647 | A | 12/1989 | Rowan et al. |
| 4,978,464 | A | 12/1990 | Coyle et al. |
| 5,132,478 | A | 7/1992 | Ho et al. |
| 5,254,274 | A | 10/1993 | Ho et al. |
| 5,705,458 | A | 1/1998 | Roby et al. |
| 6,080,301 | A | 6/2000 | Berlowitz et al. |
| 6,090,989 | A | 7/2000 | Trewella et al. |
| 6,165,949 | A | 12/2000 | Berlowitz et al. |
| 7,989,670 | B2 | 8/2011 | Wu et al. |
| 2005/0192184 | A1 | 9/2005 | Wu et al. |
| 2008/0234157 | A1 | 9/2008 | Yoon et al. |
| 2012/0245300 | A1 | 9/2012 | Crowther et al. |
| 2012/0245311 | A1 | 9/2012 | Crowther et al. |
| 2012/0245313 | A1 | 9/2012 | Crowther et al. |
| 2014/0087986 | A1* | 3/2014 | Patil ..................... C10M 107/42 508/569 |
| 2014/0088262 | A1* | 3/2014 | Crowther ................ C08F 10/02 525/379 |

FOREIGN PATENT DOCUMENTS

| | | |
|---|---|---|
| WO | 2014/047423 A1 | 3/2014 |
| WO | 2021/231303 A1 | 11/2021 |

OTHER PUBLICATIONS

International Preliminary Report on Patentability received for PCT Application No. PCT/US2021/031589, mailed on Nov. 24, 2022, 10 Pages.

International Search Report and Written Opinion received for PCT Application No. PCT/US2021/031589, mailed on Sep. 23, 2021, 11 Pages.

* cited by examiner

ALKYLATED AROMATIC COMPOUNDS FOR HIGH VISCOSITY APPLICATIONS

PRIORITY

This application is a National Phase Application claiming priority to PCT Application Serial No. PCT/US2021/031589 filed May 10, 2021, which claims priority to and the benefit of U.S. Provisional Application No. 63/024,072, filed May 13, 2020, and European Patent Application No. 20188253.7 which was filed Jul. 28, 2020, the disclosures of 63/024,072 and 20188253.7 are incorporated herein by reference in their entireties.

FIELD

The present disclosure generally relates to alkylated aromatic compounds, such as alkylated naphthalenes, useful as basestocks and additives for high viscosity applications.

BACKGROUND

In formulations for lubricants, the synthetic lubricant component, such as Group IV and Group V base stocks, can play a role in enhancing the overall performance of the formulation. Research efforts in synthetic lubricants have been, in large part, towards fluids exhibiting useful viscosities over an extended range of temperature, while also showing lubricity, oxidative stability, solubility, and pour point equal to or better than mineral oils.

Conventional polyalphaolefin (PAO) synthetic lubricants, e.g., Group IV basestocks, must often be formulated with additives, such as oxidation inhibitors, additives to improve solubility, extreme pressure additives, and viscosity index (VI) improvers, to enhance performance properties. Other synthetic lubricants, such as alkylated aromatic compounds of Group V basestocks, particularly alkylated naphthalenes, are known to possess thermal stability and oxidative stability properties. Conventional alkylated aromatic compounds, including alkylated naphthalenes, are commonly used to enhance the lifetime of formulations. However, equipment trends toward enhanced energy efficiency have resulted in smaller sump volumes, higher temperature requirements, and overall more severe requirements for lubricants. Thus, alkylated aromatic compounds that have improved oxidative stability and solubility are highly desired. To achieve higher viscosities, oxidative stability, and solubility of the formulations, however, additives, and/or additional basestocks are added to the formulations. These additional components can increase production costs and can make formulations, and the preparation thereof, cumbersome.

Therefore, there is still a need for new and improved alkylated aromatic compounds, such as alkylated naphthalenes, and uses thereof in high viscosity applications, such as high viscosity lubricant formulations and oil formulations, while maintaining certain performance properties such as high oxidative stability, high solubility properties, and improved lifetime. Achieving these properties of the alkylated aromatic compounds, and of formulations comprising such, at reduced costs relative to conventional formulations and formulation components remains a need.

SUMMARY

The present disclosure generally relates to alkylated aromatic compounds, such as alkylated naphthalenes, useful as basestocks and additives for high viscosity applications.

In an embodiment is provided an alkylated aromatic compound having the structure

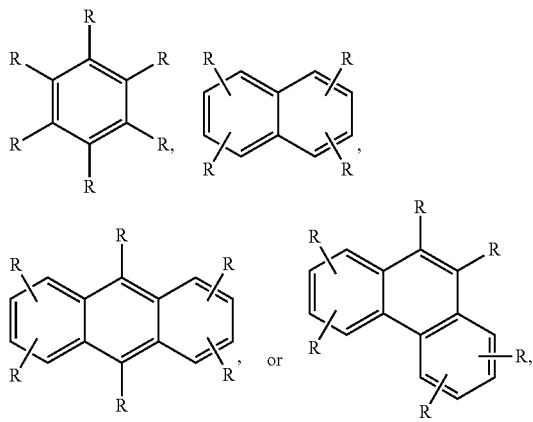

wherein:
at least one R group is a metallocene polyalphaolefin (mPAO); and
the remaining R groups, if any, are independently hydrogen, heteroatom, heteroatom containing group, an unsubstituted $C_1$-$C_{20}$ cyclic hydrocarbyl, substituted $C_1$-$C_{20}$ cyclic hydrocarbyl, unsubstituted $C_1$-$C_{20}$ acyclic hydrocarbyl, or substituted $C_1$-$C_{20}$ acyclic hydrocarbyl.

In another embodiment is provided a lubricant formulation that includes an alkylated aromatic compound.

In another embodiment is provided a lubricant formulation that includes an alkylated aromatic compound, an additive, and optionally, a Group III basestock, Group IV basestock, Group V basestock, or a combination thereof, the Group V basestock being different than the alkylated aromatic compound.

In another embodiment is provided a method of forming a lubricant formulation that includes introducing a metallocene polyalphaolefin, an aromatic compound, and an acid catalyst to a reactor under reactor conditions to form an alkylated aromatic compound; and introducing the alkylated aromatic compound to an additive to form a lubricant formulation.

DETAILED DESCRIPTION

Figure 1:
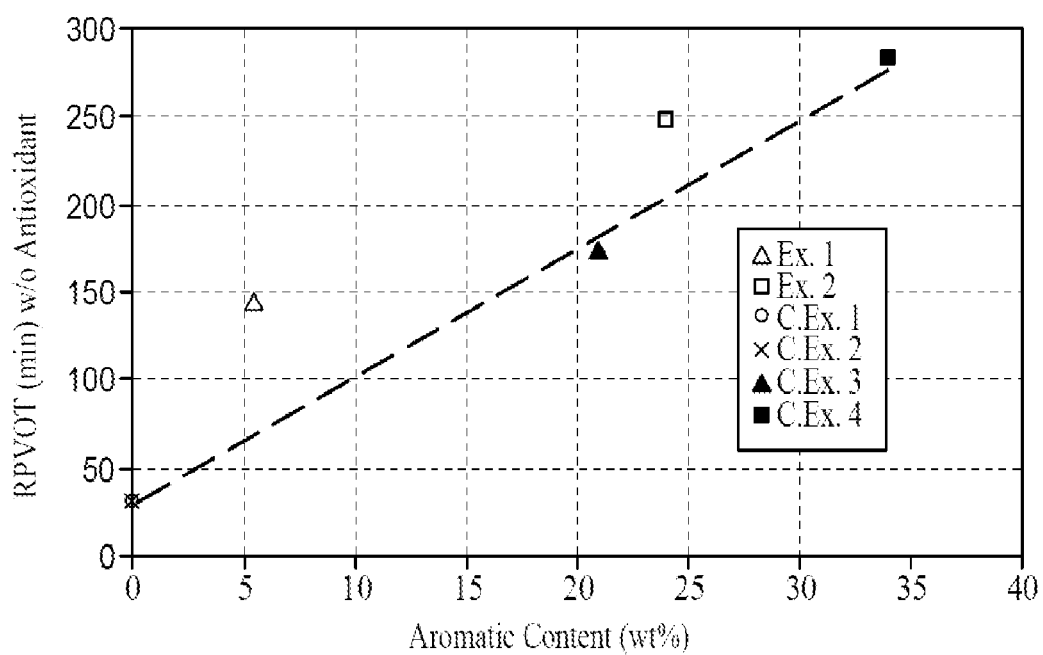
FIG. 1 is a graph of rotating pressure vessel oxidation test (RPVOT) values versus aromatic content of example and comparative neat basestocks without the addition of stabilizer according to at least one embodiment of the present disclosure.

The present disclosure generally relates to alkylated aromatic compounds, such as alkylated naphthalenes, formulations including such, and their uses in high viscosity applications. Despite efforts to date in improving synthetic lubricants, there remains a need to make improvements in their properties such as viscosity, solubility, and oxidative stability. The inventors have found that alkylating aromatic compounds with metallocene polyalphaolefins (mPAOs) can provide synthetic lubricants for high viscosity applications. The products, which are useful for, e.g., lubricant purposes, have improved oxidative stability, solubility, and other desirable properties as described below. As opposed to conventional basestocks that generally require additional additives and/or additional basestocks to improve the oxidative stability of the basestock and/or formulation, and/or to improve the solubility of additives in the lubricant formulation, the alkylated aromatic compounds of the present disclosure can enable production of lubricants without such additional additives and/or additional basestocks. Thus, the alkylated aromatic compounds of the present disclosure provide for, at least, using less additives and fewer basestocks to blend in formulations, thereby improving costs and enabling the manufacture of formulations to be less cumbersome.

The present disclosure, therefore, includes a method of making the improved alkylated aromatic compounds by reacting aromatic compounds with metallocene PAO (mPAO) oligomers/polymers. The alkylated aromatic compounds can be prepared from mPAO oligomers/polymers having a wide range of viscosities, as an alkylating agent for monocyclic aromatics (such as benzene and phenol) or polycyclic aromatics (e.g., naphthalene). The mPAO alkylated aromatic compounds can retain the structurally-related features of the alkylating PAO and therefore exhibit excellent properties which make them useful as, e.g., lubricant basestocks and additives. The alkylated aromatic compounds of the present disclosure can provide excellent solubility and oxidative stability of formulations, improved lifetime of the formulations, and can be used for applications such as high viscosity lubricants and high viscosity oils. In addition, the alkylated aromatic compounds of the present disclosure show improved additive response and improved compatibility with, e.g., seals and housings.

The inventors have found that, as a basestock, the alkylated aromatic compounds, such as alkylated naphthalenes, unexpectedly show a higher oxidative stability relative to a blend of high viscosity PAO and commercially offered alkylated naphthalene of equivalent aromatic content. The combination of PAOs and Alkylated naphthalene into one molecule provides higher oxidative stability with lower aromatic content. The combination of a lower viscosity alkylated aromatic component and a higher viscosity PAO to achieve the same aromatic content has defensive oxidative stability in our RPVOT testing.

The inventors have also found that this improved oxidative stability carries over to formulations using the alkylated aromatic compounds. Further, the inventors have found that the alkylated aromatic compounds unexpectedly provide enhanced solubility of additives such that no additional solubilizing co-basestock (e.g., adipate esters) is needed. Incorporation of a small amount of aromatic in the mPAO alters the order of the molecule which inherently improves the solubility to more polar species such as additives, as compared with similar mPAOs. These results were highly surprising as many formulators use blends of low viscosity alkylated naphthalenes and high viscosity PAOs to achieve desired lubricant properties. The inventors have found, however, however, that by synthesizing high viscosity PAOs with the functional alkylated naphthalene of the present disclosure, the resultant molecule has improvements above the blended mixture, something previously unknown to the industry. This enables formulators to more easily optimize and tailor their formulations. The inventors have also found favorable improvements in other lubricant properties such as thermal stability, pour point, and viscosity index. The alkylated aromatic compounds can be used as sole basestocks or blendstocks with other fluids in, e.g., many automotive and industrial lubricant applications.

As used herein, a "composition" can include component(s) of the composition and/or reaction product(s) of two or more components of the composition. Compositions of the present disclosure can be prepared by any suitable mixing process. As used herein, a "formulation" can include component(s) of the formulation and/or reaction product(s) of two or more components of the formulation. Formulations of the present disclosure can be prepared by any suitable mixing process.

For the purposes of this present disclosure, and unless otherwise specified, the term "olefin," alternatively termed "alkene," refers to an unsaturated hydrocarbon compound having a hydrocarbon chain containing at least one carbon-to-carbon double bond in the structure thereof, wherein the carbon-to-carbon double bond does not constitute a part of an aromatic ring. The olefin may be linear, branched, or cyclic. For purposes of this specification and the claims appended thereto, when a polymer or copolymer is referred to as comprising an olefin, including, but not limited to ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Thus, an "olefin" is intended to embrace all structural isomeric forms of olefins, unless it is specified to mean a single isomer or the context clearly indicates otherwise. An oligomer is a polymer having a low molecular weight, such as an Mn of 21,000 g/mol or less (such as 10,000 g/mol or less), and/or a low number of mer units, such as 100 mer units or less (such as 75 mer units or less).

For the purposes of this present disclosure, and unless otherwise specified, the term "alpha-olefin" refers to an olefin having a terminal carbon-to-carbon double bond in the structure thereof ((R'R")—C=$CH_2$, where R' and R" is independently hydrogen or any hydrocarbyl group; such as R' is hydrogen and R" is an alkyl group). A "linear alpha-olefin" is an alpha-olefin defined in this paragraph wherein R' is hydrogen, and R" is hydrogen or a linear alkyl group. Non-limiting examples of alpha-olefins include ethylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

For the purposes of this present disclosure, and unless otherwise specified, the term "Cn" group or compound refers to a group or a compound comprising carbon atoms at total number thereof of n. Thus, a "Cm-Cn" group or compound refers to a group or compound comprising carbon atoms at a total number thereof in the range from m to n. Thus, a $C_1$-$C_{50}$ alkyl group refers to an alkyl group comprising carbon atoms at a total number thereof in the range from 1 to 50.

For the purposes of this present disclosure, and unless otherwise specified, "polyalphaolefin(s)" (PAO(s)) are polymers of one or more alpha-olefin monomers, such as an oligomer of one or more alpha-olefins. PAOs are polymeric, typically oligomeric, molecules produced from the polymerization/oligomerization reactions of alpha-olefin monomer molecules in the presence of a catalyst system. Thus, the PAO can be a dimer (resulting from two terminal olefin molecules), a trimer (resulting from three terminal olefin molecules), a tetramer (resulting from four terminal olefin molecules), or any other oligomer or polymer comprising two or more structure units derived from one or more terminal olefin monomer(s).

The PAO molecule can be highly regio-regular, such that the bulk material may exhibit an isotacticity, or a syndiotacticity when measured by $^{13}C$ NMR. The PAO molecule can be highly regio-irregular, such that the bulk material can be substantially atactic when measured by $^{13}C$ NMR. A PAO material made by using a metallocene-based catalyst system is typically called a metallocene-PAO, and a PAO material made by using traditional non-metallocene-based catalysts (e.g., Lewis acids, supported chromium oxide, and the like) is typically called a conventional PAO.

For the purposes of this present disclosure, and unless otherwise specified, the term "carbon backbone" refers to the longest straight carbon chain in the molecule of the compound or the group in question. "Branches" or "pendant groups" interchangeably refer to any non-hydrogen group connected to the carbon backbone other than those attached to the carbon atoms at the very ends of the carbon backbone. As used herein, the term "length" of a pendant group is defined as the total number of carbon atoms in the longest carbon chain in the pendant group, counting from the first carbon atom attached to the carbon backbone and ending with the final carbon atom therein, without taking into consideration any substituents or pendant groups on the chain. In some embodiments, the pendant group is free of substituents comprising more than 2 carbon atoms (or more than 1 carbon atom), or is free of any substituent. A pendant group may contain a cyclic group or a portion thereof in the longest carbon chain, in which case half of the carbon atoms in the cyclic group are counted toward the length of the pendant group. Thus, by way of examples, a linear $C_8$ pendant group has a length of 8; each of the pendant groups cyclohexylmethylene and phenylmethylene has a length of 4; and each of the pendant groups o-heptyl-phenylmethylene and p-heptylphenylmethylene has a length of 11. Where a PAO molecule contains multiple pendant groups, the arithmetic average of the lengths of all such pendant groups is calculated as the average length of all pendant groups in the PAO molecule.

For the purposes of this present disclosure, and unless otherwise specified, the terms "group," "radical," and "substituent" may be used interchangeably.

For the purposes of this present disclosure, and unless otherwise specified, the term "alkyl" or "alkyl group" interchangeably refers to a hydrocarbyl group consisting of carbon and hydrogen atoms. An alkyl group can be substituted or unsubstituted and can be linear, branched, or cyclic.

For the purposes of this present disclosure, and unless otherwise specified, the term "cycloalkyl" or "cycloalkyl group" interchangeably refers to a hydrocarbyl group wherein the carbon atoms form one or more ring structures.

For the purposes of this present disclosure, and unless otherwise specified, the term "alkenyl" or "alkenyl group" interchangeably refers to a linear unsaturated hydrocarbyl group comprising a C=C bond therein.

For the purposes of this present disclosure, and unless otherwise specified, the term "aryl" or "aryl group" interchangeably refers to a hydrocarbyl group comprising an aromatic ring structure therein.

For the purposes of this present disclosure, and unless otherwise specified, a substituted group refers to a group in which at least one atom is replaced by a different atom or a group. Thus, a substituted alkyl group is an alkyl group in which at least one hydrogen atom is replaced by a hydrocarbyl group, a halogen, any other non-hydrogen group, and/or at least one carbon atom and hydrogen atoms bonded thereto is replaced by a different group. As a non-limiting example, a substituted group is a radical in which at least one hydrogen atom has been substituted with a heteroatom or heteroatom containing group, such as with at least one functional group, such as halogen (Cl, Br, I, F), $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one heteroatom has been inserted within the hydrocarbyl radical, such as halogen (Cl, Br, I, F), O, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where $R^*$ is, independently, hydrogen or a hydrocarbyl.

For the purposes of this present disclosure, and unless otherwise specified, the terms "hydrocarbyl radical," "hydrocarbyl group," or "hydrocarbyl" interchangeably refer to a group consisting of hydrogen and carbon atoms only. A hydrocarbyl group can be saturated or unsaturated, linear or branched, cyclic or acyclic, aromatic, or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, and aryl groups, such as phenyl, benzyl, and naphthyl.

For the purposes of this present disclosure, and unless otherwise specified, substituted hydrocarbyl radicals are radicals in which at least one hydrogen atom has been substituted with a heteroatom or heteroatom containing group, such as with at least one functional group, such as halogen (Cl, Br, I, F), $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one heteroatom has been inserted within the hydrocarbyl radical, such as halogen (Cl, Br, I, F), O, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where $R^*$ is, independently, hydrogen or a hydrocarbyl.

In some embodiments, the hydrocarbyl radical is defined to be C1-C100 alkyls that may be linear, branched, or cyclic.

Non-limiting examples of such radicals can include methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Also included are isomers of saturated, partially unsaturated and aromatic cyclic structures wherein the radical may additionally be subjected to the types of substitutions described above. Examples include phenyl, methylphenyl, benzyl, methylbenzyl, naphthyl, cyclopropyl, cyclobutyl, cyclopentyl, cyclohexyl, cyclohexenyl, methylcyclohexyl, cyclooctyl, and the like. For this present disclosure, when a radical is listed, it indicates that radical type and all other radicals formed when that radical type is subjected to the substitutions defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compound having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

For the purposes of this present disclosure, and unless otherwise specified, the terms "alkoxy" and "alkoxide" refer to an alkyl or aryl group bound to an oxygen atom, such as an alkyl ether or aryl ether group/radical connected to an oxygen atom and can include those where the alkyl/aryl group is a $C_1$-$C_{10}$ hydrocarbyl. The alkyl group may be straight chain, branched, or cyclic. The alkyl group may be saturated or unsaturated. Examples of suitable alkoxy radicals can include methoxy, ethoxy, n-propoxy, iso-propoxy, n-butoxy, iso-butoxy, sec-butoxy, tert-butoxy, phenoxyl.

For the purposes of this present disclosure, and unless otherwise specified, the term "substituted hydrocarbyl" refers to a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)q-SiR*$_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

For the purposes of this present disclosure, and unless otherwise specified, the term "ring atom" refers to an atom that is part of a cyclic ring structure. By this definition, a benzyl group has six ring atoms and tetrahydrofuran has 5 ring atoms.

For the purposes of this present disclosure, and unless otherwise specified, the term "aryl" or "aryl group" refers to an aromatic ring such as phenyl, naphthyl, xylyl, etc. Likewise, heteroaryl refers to an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic.

For the purposes of this present disclosure, and unless otherwise specified, a heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., n-butyl, iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol (g mol$^{-1}$).

For the purposes of this present disclosure, and unless otherwise specified, all numerical values within the detailed description and the claims herein are modified by "about" or "approximately" the indicated value, and consider experimental error and variations that would be expected by a person having ordinary skill in the art.

For the purposes of this present disclosure, and unless otherwise specified, all percentages of pendant groups, terminal carbon chains, and side chain groups are by mole, unless specified otherwise. Percent by mole is expressed as "mol %," and percent by weight is expressed as "wt %."

The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, Ph is phenyl, and RT is room temperature (and is 23° C. unless otherwise indicated).

Metallocene PAO

The mPAO can be synthesized as provided in U.S. Pat. No. 7,989,670, which is incorporated by reference herein in its entirety.

In some embodiments, the mPAO oligomers/polymers useful as alkylating agents to form the alkylated aromatic compounds can have one or more of the following characteristics:

(1) A weight average molecular weight (Mw) that can be from about 280 g/mol to about 450,000 g/mol, such as from about 300 g/mol to about 100,000 g/mol, such as from about 350 g/mol to about 75,000 g/mol, such as from about 400 g/mol to about 50,000 g/mol.

(2) A number average molecular weight (Mn) that can be less than about 200,000, such as from about 280 g/mol to about 180,000 g/mol, such as from about 300 g/mol to about 10,000 g/mol, such as from about 400 g/mol to about 5,000 g/mol.

(3) Measured in carbon numbers, a molecular weight that can be from about $C_{20}$ to about $C_{13000}$, such as from about $C_{30}$ to about $C_{1000}$, such as from about $C_{33}$ to about $C_{500}$.

(4) A molecular weight distribution (MWD), defined as Mw/Mn, that can be from about 1 to about XX, such as from about 1.2 to about 4, such as from about 1.3 to about 3, such as from about 1.4 to about 2.5, such as from about 1.5 to about 2.0, such as from about 1.6 to about 1.8.

(5) A kinematic viscosity at 40° C. (KV40, ASTM D445) that can be from about 1 cSt to about 10,000 cSt, such as from about 3 cSt to about 1,000 cSt, such as from about 10 cSt to about 500 cSt.

(6) A kinematic viscosity at 100° C. (KV100, ASTM D445) that can be from about 1 cSt to about 7500 cSt, such as from about 1.5 cSt to about 5000, such as from about 2 cSt to about 3000 cSt, such as from about 5 cSt to about 2000 cSt, such as from about 10 cSt to about 1000 cSt, such as from about 15 cSt to about 800 cSt, such as from about 20 cSt to about 600 cSt, such as from about 20 cSt to about 500 cSt, such as from about 20 cSt to about 400 cSt, such as from about 20 cSt to about 300 cSt, such as from about 20 cSt to about 200 cSt. The exact kinematic viscosities (KV40 and KV100) of the mPAO can be controlled by, e.g., monomer used, polymerization temperature, polymerization reactor residence time, catalyst used, concentration of catalyst used, distillation and separation conditions.

(7) A viscosity index (ASTM D2270) that can be from about 50 to about 400, such as from about 100 to about 300, such as from about 130 to about 250.

In at least one embodiment, the mPAO oligomer/polymer useful as an alkylating agent can have atactic molecular structure of mostly uniform head-to-tail connections with some head-to-head type connections in the structure. These low branch ratio mPAO oligomers/polymers can have high viscosity indices at least about 15 to 20 units and typically 30-40 units higher than equivalent viscosity conventional oligomers/polymers, which regularly have higher branch ratios and correspondingly lower viscosity indices. These low branch mPAO oligomers/polymers maintain better or comparable pour points, and lower traction than conventional PAOs.

The metallocene PAO (mPAO) can be characterized by a high percentage of unique head-to-head connections at the end position of the polymer chain and a high degree of stereo-regularity. The term "head-to-head connection" refers to a connection formed on at least one end of the PAO oligomer or polymer in which the penultimate olefin inserted 1,2 and the last olefin inserted 2,1 into the oligomer or polymer chain. Because of their usually narrow molecular weight distribution, the mPAO have superior shear stability. Because of their unique chemical composition, they have excellent viscometrics and unexpected low traction properties. The mPAO can serve as an alkylating agent.

Alkylated Aromatic Compounds

In at least one embodiment, the mPAO oligomer/polymers can serve as alkylating agents to form alkylated aromatic compounds.

The alkylated aromatic compounds can be prepared in a Friedel-Crafts type acid-catalyzed alkylation reaction. Acid catalysts which can be used include typical Friedel-Crafts type catalysts, which can be either liquid (homogeneous) and solid (heterogeneous) catalysts including Lewis acids such as, but not limited to, $BF_3$, $AlCl_3$, triflic acid (also known as trifluoromethanesulfonic acid), HCl, HF, HBr, $H_2SO_4$, $H_3PO_4$, $P_2O_5$, $SO_3$, $SnCl_4$, $FeCl_3$, $ZnCl_2$, $TiCl_4$, $SbCl_5$, and a combination thereof. Solid acidic catalysts such as those exhibiting Brønsted acid activity, for example, acidic zeolites as well as acidic clay catalysts or amorphous aluminosilicates can also be used, such as ZSM-5 in the protonic form and organic cation exchange resins (which can be regarded as solid acids) such as R—$SO_3H$ where R is a polymeric resin such as sulfonated polystyrene. In at least one embodiment, the catalyst can be triflic acid, $AlCl_3$, $BF_3$, Zeolite Beta, Zeolite Y, ZSM-5, ZSM-35, Amberlyst 15, or a combination thereof.

In at least one embodiment, the aromatic compounds used as a starting material for the alkylation reaction can include aromatic hydrocarbons such as substituted and unsubstituted benzene and polynuclear aromatic compounds, such as naphthalene, anthracene and phenanthracene. Aromatic compounds can also include substituted and unsubstituted heteroaromatic compounds including substituted and unsubstituted polynuclear heteroatomatic compounds, where one or more heteroatoms (such as N, O, S) is substituted for one or more carbon atoms (such as pyridine, pyrimidine, indole, quinolone, thiophene, thiazole, benzofuran, chromene, and xanthene, and derivatives thereof). Non-limiting examples of aromatic compounds can include benzene, toluene, o-xylene, m-xylene, p-xylene, 1,2,3-trimethylbenzene, pseudocumene, ethylbenzene, n-propylbenzene, cumene, n-butylbenzene, isobutylbenzene, sec-butylbenzene, tert-butylbenzene, p-cymene, biphenyl, diphenylmethane, triphenyl methane, 1,2-diphenylethane and similarly alkyl substituted naphthalenes and anthracenes; also phenol, catechol, acylphenol such as acetylphenol, carbonate esters such as phenyl methyl or ethyl carbonate and diphenyl carbonate, alkylphenol such as anisole, chloro- and bromo-benzene, aniline, acyl aniline such as acetanilide, methylbenzoate and ethylbenzoate, thiophenol and acylated thiophenol, nitrobenzene, diphenylether, diphenylsulfide and similarly substituted naphthalenes and anthracenes, and naphthols such as monohydroxynaphthalene and dihydroxynaphthalene.

In at least one embodiment, the alkylation process conditions can include: a temperature from about −30° C. to about 350° C., such as from about 0° C. to about 250° C., such as from about 21° C. to about 200° C.; and/or a pressure from about 100 kPa to about 7000 kPa, such as from about 100 kPa to about 1000 kPa, such as from about 100 kPa to about 700 kPa.

In at least one embodiment, a weight ratio of mPAO starting olefin to catalyst can be from about 1000:1 to about 5:1, such as from about 500:1 to about 10:1. A weight ratio of mPAO starting olefin to aromatic compound(s) can be from about 1000:1 to about 5:1, such as from about 50:1 to about 4:1, but depending upon the degree of alkylation of the aromatic which is desired—or, conversely, aromatization of the mPAO—the ratio can be altered accordingly.

The alkylated aromatic compounds can contain about 65 wt % or more of mPAO hydrocarbon moiety and for such products the molar ratio of the mPAO oligomer/polymer to the aromatic component of the reaction can be about 1:1 or more, such as about 1.5:1 or more (mPAO:aromatic). In other cases, the molar ratio of the mPAO oligomer/polymer to the aromatic component of the reaction can be chosen to provide the desired type of product. For example, if the aromatic/mPAO moiety ratio is to be about 1:1, a ratio of about 1:1 (molar) can be appropriate, although some variation from this can be necessary depending upon the relative reactivities of the two reactant species. In at least one embodiment, a molar ratio from about 0.1:1 to about 10:1, such as from about 0.2:1 to about 5:1, can be used.

In at least one embodiment, the product aromatic compounds can have structures such as

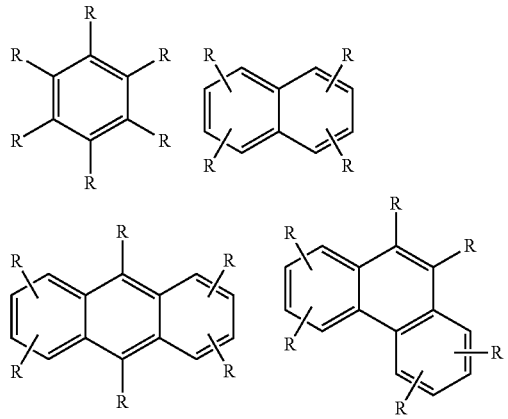

wherein at least one R group is a mPAO oligomer/polymer residue. The remaining R groups, if any, can be independently hydrogen, heteroatom, heteroatom containing group, a hydrocarbyl group, or a substituted hydrocarbyl, for example, unsubstituted $C_1$-$C_{20}$ cyclic hydrocarbyl, substituted $C_1$-$C_{20}$ cyclic hydrocarbyl, unsubstituted $C_1$-$C_{20}$ acyclic hydrocarbyl, and substituted $C_1$-$C_{20}$ acyclic hydrocarbyl. In some embodiments, at least one R group can include at least one heteroatom (such as halogen, e.g., Br, Cl, F or I) or heteroatom-containing group (such as a functional group, e.g., —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, —$(CH_2)q$-$SiR^*_3$, and the like, where q is 1 to 10 and each $R^*$ is independently hydrogen, a hydrocarbyl or halocarbyl radical, and two or more $R^*$ can join together to form a substituted or unsubstituted completely saturated, partially unsaturated, or aromatic cyclic or polycyclic ring structure), or where at least one heteroatom has been inserted within a hydrocarbyl ring.

In some embodiments, the alkylated aromatic compounds useful as, e.g., basestocks, co-basestocks, and/or components of formulations, can have one or more of the following characteristics:

(1) A weight average molecular weight (Mw) that can be from about 280 g/mol to about 450,000 g/mol, such as from about 300 g/mol to about 100,000 g/mol, such as from about 350 g/mol to about 75,000 g/mol, such as from about 400 g/mol to about 50,000 g/mol.

(2) A number average molecular weight (Mn) that can be less than about 200,000, such as from about 280 g/mol to about 180,000 g/mol, such as from about 300 g/mol to about 10,000 g/mol, such as from about 400 g/mol to about 5,000 g/mol.

(3) A kinematic viscosity at 40° C. (KV40, ASTM D445) that can be from about 1 cSt to about 10,000 cSt, such as from about 50 cSt to about 7,500 cSt, such as from about 60 cSt to about 5,000 cSt, such as from about 70 cSt to about 2,500 cSt, such as from about 80 cSt to about 1,000 cSt. In some embodiments, the KV40 can be from about 60 cSt to about 500 cSt or from about 500 cSt to about 3,000 cSt. In some embodiments, the KV40 can be from about 1 cSt to about 10,000 cSt, or from about 5 cSt to about 6,000 cSt, or from about 50 cSt to about 4,000 cSt, or from about 60 cSt to about 5,000 cSt.

(4) A kinematic viscosity at 100° C. (KV100, ASTM D445) that can be from about 1 cSt to about 7,500 cSt, such as from about 5 cSt to about 1,000 cSt, such as from about 10 to about 500 cSt, such as from about 15 to about 300 cSt, such as from about 15 cSt to about 50 cSt or from about 50 cSt to about 300 cSt. In some embodiments, the KV100 can be from about 1 cSt to about 7,500 cSt, or from about 3 cSt to about 1,000 cSt, or from about 10 cSt to about 500 cSt.

(5) A viscosity index (ASTM D2270) that can be from about 50 to about 400, such as from about 60 to about 300, such as from about 70 to about 200 or from about 80 to about 200. In at least one embodiment, the viscosity index can be from about 100 to about 300 or from about 130 to about 250.

(6) A rotating pressure vessel oxidation test (RPVOT) (ASTM D2272) value that can be about 5 minutes or more, such as from about 10 minutes to about 5000 minutes, such as from about 20 minutes to about 3000 minutes, such as from about 30 minutes to about 2000 minutes, such as from about 70 minutes to about 500 minutes, such as from about 100 minutes to about 300 minutes.

(7) A bromine number (ASTM D1159) that can be about 5 or less, such as about 4 or less, such as about 3 or less, such as about 2 or less, such as about 1 or less, such as from about 0.0001 to about 1, such as from about 0.001 to about 0.5. In at least one embodiment, the bromine number can be about 0.9 or less, such as about 0.8 or less, such as about 0.7 or less, such as about 0.6 or less.

(8) A pour point (ASTM D97) that can be about 0° C. or less, such as about −20° C. or less, such as about −25 or less. In at least one embodiment, the pour point can be from about −10° C. to about −100° C., such as from about −20° C. to about −95° C., such as from about −25° C. to about −40° C.

(9) An aromatic content (ASTM D1840) that can be from about 0.1 wt % to about 40 wt %, such as from about 1 wt % to about 35 wt %, such as from about 3 wt % to about 30 wt %.

(10) A total amount of solids dropout, as a measure of solubility, (measured in grams) that can be from about 0 g to about 30 g, such as from about 0.0001 g to about 1 g, such as from about 0.0005 g to about 0.1 g. The procedure for measuring total amount of dropout is provided below.

In at least one embodiment, a medium viscosity alkylated naphthalene ("MV-AN") can be used as a neat basestock or as a basestock in a formulation. The MV-AN can have a KV40 (ASTM D445) from about 60 cSt to about 500 cSt, such as from about 66 cSt to about 400 cSt; a KV100 (ASTM D445) from 10 cSt to about 40 cSt, such as from about 15 cSt to about 30 cSt; and/or a viscosity index (ASTM D2270) from about 80 cSt to about 200 cSt.

In at least one embodiment, a high viscosity alkylated naphthalene ("HV-AN") can be used as a neat basestock or as a basestock in a formulation. The HV-AN can have a KV40 (ASTM D445) from about 400 cSt to about 5,000 cSt, such as from about 500 cSt to about 3,000 cSt; a KV100 (ASTM D445) from about 40 cSt to about 500 cSt, such as from about 50 cSt to about 300 cSt; and/or a viscosity index (ASTM D2270) from about 80 cSt to about 200 cSt.

The alkylated aromatic compounds described herein are a new class of lubricant basestocks and blendstocks with superior thermal and oxidative stabilities, and superior solubility properties. Other properties include better antiwear properties, high viscosity index, low pour point, and/or VI enhancement. These alkylated aromatic compounds do not need conventional hydroprocessing (e.g., hydrofinishing) operations usually required for the lubricant basestock.

As an additive (or component) of a composition or formulation, the usefulness of the alkylated aromatic compounds is carried over to the composition or formulation by the incorporation additional capabilities in a single product, for example, the capability to improve a lube basestock oxidative stability, solubility properties, and other characteristics. They possess, at least, the further advantage of greater flexibility in the range of viscosity in which they can be prepared so that their additive properties can be used in a viscosity compatible with the viscosity formulation of the lube basestock.

Lubricant Formulations

The present disclosure also generally relates to lubricant formulations containing an alkylated aromatic of the present disclosure. The lubricant formulations can additionally contain an additive and/or an additional basestock. The lubricant formulations can be useful in applications such as gear oils, compressor oils, hydraulic oils, greases, circulating fluids, engine oils, transmission fluids, axle fluids, driveline fluids, cooling fluids for electric vehicles, cooling fluids for electronics.

Alkylated aromatic compounds of the present disclosure can be present in a lubricant formulation in an amount from about 0.1 wt % to about 99.9 wt %, such as from about 1 wt % to about 99 wt %, such as from about 25 wt % to about 95 wt %, such as from about 35 wt % to about 90 wt %, such as from about 45 wt % to about 85 wt %, such as from about 50 wt % to about 80 wt %, such as from about 55 wt % to about 75 wt %, such as from about 60 wt % to about 65 wt %, based on the total weight of the lubricant formulation. In at least one embodiment, the amount of alkylated aromatic present in a lubricant formulation, based on the total weight of the lubricant formulation, can be in an amount from wt $\%_1$ to wt $\%_2$, where wt $\%_1$ and wt $\%_2$ can be, independently, e.g., about 1, about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50, about 51, about 52, about 53, about 54, about 55, about 56, about 57, about 58, about 59, about 60, about 61, about 62, about 63, about 64, about 65, about 66, about 67, about 68, about 69, about 70, about 71, about 72, about 73, about 74, about 75, about 76, about 77, about 78, about 79, about 80, about 81, about 82, about 83, about 84, about 85, about 86, about 87, about 88, about 89, about 90, about 91, about 92, about 93, about 94, about 95, about 96, about 97, about 98, or about 99, as long as wt $\%_1$<wt $\%_2$.

In at least one embodiment, the lubricant formulation can contain one or more additional basestocks (apart from the alkylated aromatic basestock of the present disclosure), one or more additives, or a combination thereof. The one or more additional basestocks, which are discussed below, can be present in the lubricant formulation in an amount from about 0.1 wt % to about 99.9 wt %, such as from about 1 wt % to about 99 wt %, such as from about 2 wt % to about 98 wt %, such as from about 4 wt % to about 95 wt %, such as from about 5 wt % to about 90 wt %, such as from about 6 wt % to about 85 wt %, such as from about 7 wt % to about 80 wt %, such as from about 8 wt % to about 75 wt %, such as from about 10 wt % to about 70 wt %, based on the total weight of the lubricant formulation. In at least one embodiment, the amount of one or more additional basestocks (apart from the alkylated aromatic basestock of the present disclosure) present in a lubricant formulation, based on the total weight of the lubricant formulation, can be in an amount from wt $\%_3$ to wt $\%_4$, where wt $\%_3$ and wt $\%_4$ can be, independently, e.g., about 1, about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50, about 51, about 52, about 53, about 54, about 55, about 56, about 57, about 58, about 59, about 60, about 61, about 62, about 63, about 64, about 65, about 66, about 67, about 68, about 69, about 70, about 71, about 72, about 73, about 74, about 75, about 76, about 77, about 78, about 79, about 80, about 81, about 82, about 83, about 84, about 85, about 86, about 87, about 88, about 89, about 90, about 91, about 92, about 93, about 94, about 95, about 96, about 97, about 98, or about 99, as long as wt $\%_3$<wt $\%_4$.

The one or more additives, which are discussed below, can be present in the lubricant formulation in an amount from about 0.1 wt % to about 12 wt %, or from about 1 wt % to about 3 wt %. In at least one embodiment, the one or more additional additives can be present in the lubricant formulation, based on the total weight of the lubricant formulation, in an amount from wt $\%_5$ to wt $\%_6$, where wt $\%_5$ and wt $\%_6$ can be, independently, e.g., about 0.1, about 0.2, about 0.3, about 0.4, about 0.5, about 0.6, about 0.7, about 0.8, about 0.9, about 1, about 1.2, about 1.4, about 1.6, about 1.8, about 2, about 2.2, about 2.3, about 2.4, about 2.6, about 2.8, about 3, about 3.2, about 3.4, about 3.6, about 3.8, about 4, about 4.2, about 4.4, about 4.6, about 4.8, about 5, about 5.2, about 5.4, about 5.6, about 5.8, about 6, about 6.2, about 6.4, about 6.6, about 6.8, about 7, about 7.2, about 7.4, about 7.6, about 7.8, about 8, about 8.2, about 8.4, about 8.6, about 8.8, about 9, about 9.2, about 9.4, about 9.6, about 9.8, about 10, about 10.2, about 10.4, about 10.6, about 10.8, about 11, about 11.2, about 11.4, about 11.6, about 11.8, as long as wt $\%_5$<wt $\%_6$. In at least one embodiment, less than about 0.001 wt % and up to about 10-20 wt % or more of one or more additives can be present in the lubricant formulation, based on the total weight of the lubricant formulation.

In at least one embodiment, the lubricant formulation can include an alkylated aromatic compound as the sole basestock. As opposed to conventional lubricant formulations that use low viscosity alkylated aromatic compounds, no additional basestock or co-basestock is needed to achieve a desired balance of properties (e.g., improved oxidative stability and solubility) for high viscosity applications. However, in at least one embodiment, an additional basestock can be added to the lubricant formulation. Such additional basestocks can include a Group I basestock, Group II basestock, Group III basestock, Group IV basestock, a Group V basestock, or a combination thereof.

Groups I, II, III, IV and V are broad categories of basestocks developed and defined by the American Petroleum Institute (API Publication 1509; www.API.org) to create guidelines for lubricant base oils. Group I basestocks generally have a viscosity index from about 80 to 120 and contain greater than about 0.03% sulfur and/or less than about 90% saturates. Group II basestocks generally have a viscosity index from about 80 to 120, and contain less than or equal to about 0.03% sulfur and greater than or equal to about 90% saturates. Group III basestocks generally have a viscosity index greater than about 120 and contain less than or equal to about 0.03% sulfur and greater than about 90% saturates. Group IV basestock includes PAO. Group V basestocks include synthetic basestocks not included in Groups I-IV. Table 1 summarizes properties of each of these five groups. A discussion of Groups I to V basestocks can be found in "Synthetics, Mineral Oils and Bio-Based Lubricants, Chemistry and Technology" Edited by L. R. Rudnick, published by CRC Press, Taylor & Francis, 2005.

TABLE 1

| | Basestock Properties | | |
|---|---|---|---|
| | Saturates | Sulfur | Viscosity Index |
| Group I | <90% | >0.03% | ≥80 and <120 |
| Group II | ≥90% | ≤0.03% | ≥80 and <120 |
| Group III | ≥90% | ≤0.03% | ≥120 |
| Group IV | | Polyalphaolefins (PAO) | |
| Group V | All other stocks not included in Groups I, II, III, or IV | | |

In at least one embodiment, the formulation can include an alkylated aromatic compound of the present disclosure and at least one basestock of Group IV PAO. A synthetic oil for purposes of this application shall include all oils that are not naturally occurring mineral oils. Naturally occurring mineral oils are often referred to as API Group I oils.

Basestocks having a high paraffinic/naphthenic and saturation nature of greater than 90 wt % can be used in certain embodiments. Such basestocks include Group II and/or Group III hydroprocessed or hydrocracked basestocks, or their synthetic counterparts such as polyalphaolefin oils, GTL or similar base oils or mixtures of similar base oils.

Group V basestocks suitable for use in the lubricant formulations of the present disclosure can include esters, polyalkylene glycols, and/or alkylated aromatic compounds (including those described herein). The Group V basestocks can be used as a co-basestock with the alkylated aromatic compounds of the present disclosure. Non-limiting examples of esters include an adipate ester, TMP ester, a polyol ester or aromatic ester, such as a phthalate ester. Non-limiting examples of polyalkylene glycols include liquid polymers or copolymers made from ethylene oxide, propylene oxide, butylenes oxides or higher alkylene oxides with some degree of compatibility with PAO, other hydrocarbon fluids, GTL or mineral oils.

In at least one embodiment, Gas to liquid (GTL) basestocks can also be used with the components of this present disclosure as a portion of the basestocks used to formulate the finished lubricant. GTL materials are materials that are derived via one or more synthesis, combination, transformation, rearrangement, and/or degradation/deconstructive processes from gaseous carbon-containing compounds, hydrogen-containing compounds, and/or elements as feedstocks such as hydrogen, carbon dioxide, carbon monoxide, water, methane, ethane, ethylene, acetylene, propane, propylene, propyne, butane, butylenes, and butynes. GTL basestocks and base oils are GTL materials of lubricating viscosity that are generally derived from hydrocarbons, for example, waxy synthesized hydrocarbons, that are themselves derived from simpler gaseous carbon-containing compounds, hydrogen-containing compounds and/or elements as feedstocks. GTL basestock(s) include oils boiling in the lube oil boiling range separated/fractionated from GTL materials such as by, for example, distillation or thermal diffusion, and subsequently subjected to well-known catalytic or solvent dewaxing processes to produce lube oils of reduced/low pour point; wax isomerates, comprising, for example, hydroisomerized or isodewaxed synthesized hydrocarbons; hydroisomerized or isodewaxed Fischer-Tropsch ("F-T") material (i.e., hydrocarbons, waxy hydrocarbons, waxes and possible analogous oxygenates); such as hydroisomerized or isodewaxed F-T hydrocarbons or hydroisomerized or isodewaxed F-T waxes, hydroisomerized or isodewaxed synthesized waxes, or a combination thereof.

GTL basestock(s) derived from GTL materials, especially, hydroisomerized/isodewaxed F-T material derived basestock(s), and other hydroisomerized/isodewaxed wax derived basestock(s) are characterized typically as having kinematic viscosities at 100° C. from about 2 mm$^2$/s to about 50 mm$^2$/s, such as from about 3 mm$^2$/s to about 50 mm$^2$/s, such as from about 3.5 mm$^2$/s to about 30 mm$^2$/s, as exemplified by a GTL basestock derived by the isodewaxing of F-T wax, which has a kinematic viscosity of about 4 mm$^2$/s at 100° C. and a viscosity index of about 130 or greater. The term GTL base oil/basestock and/or wax isomerate base oil/basestock as used herein and in the claims is to be understood as embracing individual fractions of GTL basestock/base oil or wax isomerate basestock/base oil as recovered in the production process, mixtures of two or more GTL basestocks/base oil fractions and/or wax isomerate basestocks/base oil fractions, as well as mixtures of one or two or more low viscosity GTL basestock(s)/base oil fraction(s) and/or wax isomerate basestock(s)/base oil fraction(s) with one, two or more high viscosity GTL basestock(s)/base oil fraction(s) and/or wax isomerate basestock(s)/base oil fraction(s) to produce a bi-modal blend wherein the blend exhibits a viscosity within the aforesaid recited range.

GTL basestocks and base oils derived from GTL materials, especially hydroisomerized/isodewaxed F-T material derived basestock(s), and other hydroisomerized/isodewaxed wax-derived basestock(s), such as wax hydroisomerates/isodewaxates, which can be used as basestock components of this present disclosure can be further characterized typically as having pour points of about −5° C. or lower, such as about −10° C. or lower, such as about −15° C. or lower, such as about −20° C. or lower, such as about −25° C. or lower, such as from about −30° C. to about −40° C. or lower. If desired, a separate dewaxing step can be practiced to achieve the desired pour point.

The GTL basestock(s) derived from GTL materials, especially hydroisomerized/isodewaxed F-T material derived basestock(s), and other hydroisomerized/isodewaxed wax-derived basestock(s) which are basestock components which can be used in this present disclosure can also be characterized typically as having viscosity indices of about 80 or greater, such as about 100 or greater, such as about 120 or greater. Additionally, in certain particular instances, viscosity index of these basestocks can be about 130 or greater, such as about 135 or greater, such as about 140 or greater. For example, GTL basestock(s) that derive from GTL materials such as F-T materials especially F-T wax can generally have a viscosity index of about 130 or greater.

In addition, the GTL basestock(s) are typically highly paraffinic of greater than about 90% saturates and can contain mixtures of mono-cycloparaffins and multi-cycloparaffins in combination with non-cyclic isoparaffins. The ratio of the cycloparaffin (e.g., naphthenic) content in such combinations can vary with the catalyst and temperature used. Further, GTL basestocks and base oils typically have very low sulfur and nitrogen content, generally containing less than about 10 ppm, and more typically less than about 5 ppm of each of these elements. The sulfur and nitrogen content of GTL basestock and base oil obtained by the hydroisomerization/isodewaxing of F-T material, especially F-T wax can be essentially nil.

In at least one embodiment, the GTL basestock(s) includes paraffinic materials that consist predominantly of non-cyclic isoparaffins and only minor amounts of cycloparaffins. These GTL basestock(s) typically include paraffinic materials that consist of greater than about 60 wt % non-cyclic isoparaffins, such as greater than about 80 wt % non-cyclic isoparaffins, such as greater than about 85 wt % non-cyclic isoparaffins, such as greater than about 90 wt % non-cyclic isoparaffins.

Useful compositions of GTL basestock(s), hydroisomerized or isodewaxed F-T material derived basestock(s), and wax-derived hydroisomerized/isodewaxed basestock(s), such as wax isomerates/isodewaxates, are recited in U.S. Pat. Nos. 6,080,301; 6,090,989, and 6,165,949 for example, each of which is fully incorporated herein by reference for US purposes.

Additives

The alkylated aromatic compounds described herein, as part of a formulation, show unique properties-such as oxidative stability solubility characteristics. Thus, in at least one embodiment additives may not be needed for formulations. However, in at least one embodiment, additives can be added to a formulation. Such additives can include, but are not limited to, extreme pressure additives, antioxidants, solubility additives, friction modifiers, antifoam agent, dispersants, detergents, corrosion inhibitors, rust inhibitors, metal deactivators, anti-wear agents, anti-seizure agents, wax modifiers, viscosity index improvers, viscosity modifiers, fluid-loss additives, seal compatibility agents, lubricity agents, anti-staining agents, chromophoric agents, demulsifiers, emulsifiers, densifiers, wetting agents, gelling agents, tackiness agents, colorants, and others, and a combination thereof. For a review of many commonly used additives, see Klamann in Lubricants and Related Products, Verlag Chemie, Deerfield Beach, Fla.; ISBN 0-89573-177-0. Reference is also made to "Lubricant Additives Chemistry and Applications" edited by Leslie R. Rudnick, Marcel Dekker, Inc. New York, 2003 ISBN: 0-8247-0857-1.

Viscosity Improvers

Viscosity improvers (also known as Viscosity Index modifiers, and VI improvers) can be included in lubricant formulations of the present disclosure. Viscosity improvers can increase the viscosity of the lubricant formulation at elevated temperatures which increases film thickness, while having limited effect on viscosity at low temperatures.

Suitable viscosity improvers include high molecular weight hydrocarbons, polyesters and viscosity index improver dispersants that function as both a viscosity index improver and a dispersant. Typical molecular weights (in g/mol) of these polymers are from about 10,000 to about 1,000,000, such as about 20,000 to about 500,000, such as about 50,000 to about 200,000.

Examples of suitable viscosity improvers are polymers and copolymers of methacrylate, butadiene, olefins, or alkylated styrenes. Polyisobutylene is a commonly used viscosity index improver. Another suitable viscosity index improver is polymethacrylate (copolymers of various chain length alkyl methacrylates, for example), some formulations of which also serve as pour point depressants. Other suitable viscosity index improvers include copolymers of ethylene and propylene, hydrogenated block copolymers of styrene and isoprene, and polyacrylates (copolymers of various chain length acrylates, for example). Specific examples include styrene-isoprene or styrene-butadiene based polymers having a molecular weight from about 50,000 g/mol to about 200,000 g/mol.

The amount of viscosity modifier in a lubricant formulation of the present disclosure can range from zero to about 8 wt %, such as about 0.1 wt % to about 4 wt %, such as about 0.1 wt % to about 2 wt % based on the total weight of the lubricant formulation.

Antioxidants

Antioxidants can be included in lubricant formulations of the present disclosure. Typical antioxidants include phenolic antioxidants, aminic antioxidants and oil-soluble copper complexes.

The phenolic antioxidants can include sulfurized and non-sulfurized phenolic antioxidants. The terms "phenolic type" or "phenolic antioxidant" used herein includes compounds having one or more than one hydroxyl group bound to an aromatic ring which can itself be mononuclear, e.g., benzyl, or poly-nuclear, e.g., naphthyl and spiro aromatic compounds. Thus "phenol type" includes phenol per se, catechol, resorcinol, hydroquinone, naphthol, etc., as well as alkyl or alkenyl and sulfurized alkyl or alkenyl derivatives thereof, and bisphenol type compounds including such bi-phenol compounds linked by alkylene bridges sulfuric bridges or oxygen bridges. Alkyl phenols include mono- and poly-alkyl or alkenyl phenols, the alkyl or alkenyl group containing from about 3 carbons to about 100 carbons, such as about 4 carbons to about 50 carbons and sulfurized derivatives thereof, the number of alkyl or alkenyl groups present in the aromatic ring ranging from about 1 to up to the available unsatisfied valences of the aromatic ring remaining after counting the number of hydroxyl groups bound to the aromatic ring.

A phenolic antioxidant can be represented by the general formula:

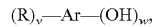

wherein:

Ar is selected from phenyl, naphthyl, biphenyl,

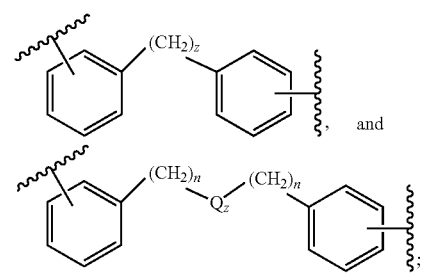

R is a $C_3$-$C_{100}$ alkyl or alkenyl group, a sulfur substituted alkyl or alkenyl group, such as a $C_4$-$C_{50}$ alkyl or alkenyl group or sulfur substituted alkyl or alkenyl group, such as $C_3$-$C_{100}$ alkyl or sulfur substituted alkyl group, such as a $C_4$-$C_{50}$ alkyl group;

Q is oxygen or sulfur;

w is at least 1 to up to the available valences of Ar;

v ranges from 0 to up to the available valances of Ar-w; and z ranges from 1 to 10, n ranges from 0 to 20.

In at least one embodiment, w ranges from 1 to 3, v ranges from 0 to 3, z ranges from 1 to 4, and n ranges from 0 to 5.

Phenolic antioxidant compounds can be the hindered phenolics and phenolic esters which contain a sterically hindered hydroxyl group, and these include those derivatives of dihydroxy aryl compounds in which the hydroxyl groups are in the o- or p-position to each other. Typical phenolic antioxidants include the hindered phenols substituted with $C_{1+}$ alkyl groups and the alkylene coupled derivatives of these hindered phenols. Examples of phenolic materials of this type 2-t-butyl-4-heptyl phenol; 2-t-butyl-4-octyl phenol; 2-t-butyl-4-dodecyl phenol; 2,6-di-t-butyl-4-heptyl phenol; 2,6-di-t-butyl-4-dodecyl phenol; 2-methyl-6-t-butyl-4-heptyl phenol; 2-methyl-6-t-butyl-4-dodecyl phenol; 2,6-di-t-butyl-4 methyl phenol; 2,6-di-t-butyl-4-ethyl phenol; and 2,6-di-t-butyl 4-alkoxy phenol; and

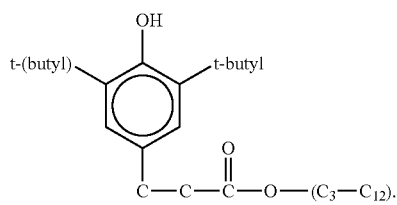

Phenolic type antioxidants in the lubricating industry include commercial examples such as Ethanox® 4710, Irganox® 1076, Irganox® L1035, Irganox® 1010, Irganox® L109, Irganox® L118, Irganox® L135 and the like.

The phenolic antioxidant can be present in a lubricant formulation in an amount from about 0.1 wt % to about 3 wt %, such as from about 1 wt % to about 3 wt %, such as from about 1.5 wt % to about 3 wt % based on the total weight of the lubricant formulation.

Aromatic amine antioxidants include phenyl-α-naphthyl amine which is described by the following molecular structure:

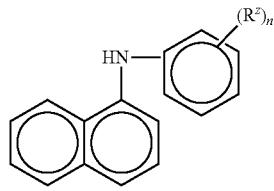

wherein $R^z$ is hydrogen or a $C_1$ to $C_{14}$ linear or $C_3$ to $C_{14}$ branched alkyl group, such as $C_1$ to $C_{10}$ linear or $C_3$ to $C_{10}$ branched alkyl group, such as linear or branched $C_6$ to $C_8$ and n is an integer ranging from 1 to 5, such as 1. A particular example is Irganox® L06.

Other aromatic amine antioxidants include other alkylated and non-alkylated aromatic amines such as aromatic monoamines of the formula $R^7R^8R^9N$ where $R^7$ is an aliphatic, aromatic or substituted aromatic group, $R^8$ is an aromatic or a substituted aromatic group, and $R^9$ is H, alkyl, aryl or $R^{10}S(O)_pR^{11}$ where $R^{10}$ is an alkylene, alkenylene, or aralkylene group, R" is a higher alkyl group, or an alkenyl, aryl, or alkaryl group, and p is 0, 1 or 2. The aliphatic group $R^7$ can contain from 1 carbon atom to 20 carbon atoms, or can contain from 6 carbon atoms to 12 carbon atoms. The aliphatic group is a saturated aliphatic group. For example, both $R^7$ and $R^8$ can be aromatic or substituted aromatic groups, and the aromatic group can be a fused ring aromatic group such as naphthyl. Aromatic groups $R^7$ and $R^8$ can be joined together with other groups such as S.

Typical aromatic amine antioxidants have alkyl substituent groups of at least 6 carbon atoms. Examples of aliphatic groups include hexyl, heptyl, octyl, nonyl, and decyl. Generally, the aliphatic groups will not contain more than 14 carbon atoms. The general types of such other additional amine antioxidants which can be present include diphenylamines, phenothiazines, imidodibenzyls and diphenyl phenylene diamines. Mixtures of two or more of such other additional aromatic amines can also be present. Polymeric amine antioxidants can also be used.

Another class of antioxidant that can be used in the lubricant formulation are oil-soluble copper compounds. Any oil-soluble suitable copper compound can be blended into the lubricant formulation. Examples of suitable copper antioxidants include copper dihydrocarbyl thio- or dithiophosphates and copper salts of carboxylic acid (naturally occurring or synthetic). Other suitable copper salts include copper dithiacarbamates, sulphonates, phenates, and acetylacetonates. Basic, neutral, or acidic copper Cu(I) and/or Cu(II) salts derived from alkenyl succinic acids or anhydrides are known to be particularly useful.

Such antioxidants can be used individually or as mixtures of one or more types of antioxidants, the total amount used in a lubricant formulation being an amount from about 0.50 wt % to about 5 wt %, such as from about 0.75 wt % to about 3 wt %, based on a total weight of the lubricant formulation.

Detergents

Detergents can be included in lubricant formulations of the present disclosure. In at least one embodiment, a detergent is an alkali or alkaline earth metal salicylate detergent.

In at least one embodiment, a detergent can be alkali or alkaline earth metal phenates, sulfonates, carboxylates, phosphonates, and a combination thereof. The detergents can have total base number (TBN) ranging from neutral to highly overbased, e.g., TBN of 0 to 500 or greater, such as 2 to 400, such as 5 to 300, and they can be present either individually or in combination with each other in an amount in the range from about 0 wt % to about 10 wt %, such as about 0.5 wt % to about 5 wt % (active ingredient) based on the total weight of the lubricant formulation.

Other detergents can be calcium phenates, calcium sulfonates, magnesium phenates, magnesium sulfonates and other related components (including borated detergents).

Dispersants

Dispersants can be included in lubricant formulations of the present disclosure. During engine operation, oil-insoluble oxidation byproducts are produced. Dispersants help keep these byproducts in solution, thus diminishing their deposition on metal surfaces. Dispersants can be ashless or ash-forming. For example, the dispersant is ashless. So called ashless dispersants are organic materials that form substantially no ash upon combustion. For example, non-metal-containing or borated metal-free dispersants are considered ashless. In contrast, metal-containing detergents discussed above form ash upon combustion.

Suitable dispersants typically contain a polar group attached to a relatively high molecular weight hydrocarbon chain. The polar group typically contains at least one nitrogen, oxygen, or phosphorus atom. Typical hydrocarbon chains contain from about 50 to about 400 carbon atoms.

In at least one embodiment, a dispersant can be an alkenylsuccinic derivative, typically produced by the reaction of a long chain substituted alkenyl succinic compound, usually a substituted succinic anhydride, with a polyhydroxy or polyamino compound. The long chain group constituting the oleophilic portion of the molecule which confers solubility in the oil, is normally a polyisobutylene group. Exemplary U.S. patents describing such dispersants are U.S. Pat. Nos. 3,172,892; 3,219,666; 3,316,177 and 4,234,435, each of which is fully incorporated herein by reference for US purposes. Other types of dispersant are described in U.S. Pat. Nos. 3,036,003 and 5,705,458, each of which is fully incorporated herein by reference for US purposes.

Hydrocarbyl-substituted succinic acid compounds can be used as dispersants. In particular, succinimide, succinate esters, or succinate ester amides prepared by the reaction of a hydrocarbon-substituted succinic acid compound, such as those having at least about 50 carbon atoms in the hydrocarbon substituent, with at least one equivalent of an alkylene amine.

Succinimides can be formed by the condensation reaction between alkenyl succinic anhydrides and amines. Molar ratios can vary depending on the amine or polyamine. For example, the molar ratio of alkenyl succinic anhydride to TEPA can vary from about 1:1 to about 5:1.

Succinate esters can be formed by the condensation reaction between alkenyl succinic anhydrides and alcohols or polyols. Molar ratios can vary depending on the alcohol or polyol used. For example, the condensation product of an alkenyl succinic anhydride and pentaerythritol is a useful dispersant.

Succinate ester amides are formed by condensation reaction between alkenyl succinic anhydrides and alkanol amines. For example, suitable alkanol amines include ethoxylated polyalkylpolyamines, propoxylated polyalkylpolyamines and polyalkenylpolyamines such as polyethylene polyamines. One example is propoxylated hexamethylenediamine.

The molecular weight of the alkenyl succinic anhydrides can typically range from about 800 g/mol to about 2,500 g/mol. The above products can be post-reacted with various reagents such as sulfur, oxygen, formaldehyde, carboxylic acids such as oleic acid, and boron compounds such as borate esters or highly borated dispersants. The dispersants can be borated with from about 0.1 to about 5 moles of boron per mole of dispersant reaction product.

Mannich base dispersants can be made from the reaction of alkylphenols, formaldehyde, and amines. Process aids and catalysts, such as oleic acid and sulfonic acids, can also be part of the reaction mixture. Molecular weights of the alkylphenols can range from about 800 g/mol to about 2,500 g/mol.

Typical high molecular weight aliphatic acid modified Mannich condensation products can be prepared from high molecular weight alkyl-substituted hydroxyaromatics or $HN(R)_2$ group-containing reactants.

Examples of high molecular weight alkyl-substituted hydroxyaromatic compounds are polypropylphenol, polybutylphenol, and other polyalkylphenols. These polyalkylphenols can be obtained by the alkylation, in the presence of an alkylating catalyst, such as $BF_3$, of phenol with high molecular weight polypropylene, polybutylene, and other polyalkylene compounds to give alkyl substituents on the benzene ring of phenol having an average molecular weight from about 600 g/mol to about 100,000 g/mol.

Examples of $HN(R)_2$ group-containing reactants include alkylene polyamines, principally polyethylene polyamines. Other representative organic compounds containing at least one $HN(R)_2$ group suitable for use in the preparation of Mannich condensation products include the mono- and di-amino alkanes and their substituted analogs, e.g., ethylamine and diethanol amine; aromatic diamines, e.g., phenylene diamine, diamino naphthalenes; heterocyclic amines, e.g., morpholine, pyrrole, pyrrolidine, imidazole, imidazolidine, and piperidine; melamine and their substituted analogs.

Examples of alkylene polyamine reactants include ethylenediamine, diethylene triamine, triethylene tetraamine, tetraethylene pentaamine, pentaethylene hexamine, hexaethylene heptaamine, heptaethylene octaamine, octaethylene nonaamine, nonaethylene decamine, and decaethylene undecamine and mixture of such amines having nitrogen contents corresponding to the alkylene polyamines, in the formula $H_2N-(Z-NH-)_nH$, mentioned before, Z is a divalent ethylene and n is 1 to 10 of the foregoing formula. Corresponding propylene polyamines such as propylene diamine and di-, tri-, tetra-, pentapropylene tri-, tetra-, penta- and hexaamines are also suitable reactants. The alkylene polyamines can be obtained by the reaction of ammonia and dihalo alkanes, such as dichloro alkanes. Thus the alkylene polyamines obtained from the reaction of about 2 moles to about 11 moles of ammonia with about 1 mole to about 10 moles of dichloroalkanes having about 2 carbon atoms to about 6 carbon atoms and the chlorines on different carbons are suitable alkylene polyamine reactants.

Aldehyde reactants useful in the preparation of the high molecular products useful in this disclosure include the aliphatic aldehydes such as formaldehyde (also as paraformaldehyde and formalin), acetaldehyde and aldol (f-hydroxybutyraldehyde). Formaldehyde or a form aldehyde-yielding reactant is exemplary.

Dispersants can include borated and non-borated succinimides, including those derivatives from mono-succinimides, bis-succinimides, and/or mixtures of mono- and bis-succinimides, wherein the hydrocarbyl succinimide is derived from a hydrocarbylene group such as polyisobutylene having a molecular weight from about 500 g/mol to about 5000 g/mol or derived from a mixture of such hydrocarbylene groups. Other exemplary dispersants include succinic acid-esters and amides, alkylphenol-polyamine-coupled Mannich adducts, their capped derivatives, and other related components. Such additives can be used in an amount of about 0.1 wt % to about 20 wt %, such as about 0.1 wt % to about 8 wt %, such as about 1 wt % to 6 wt % (on an as-received basis) based on the total weight of the lubricant formulation.

Pour Point Depressants

Pour point depressants (also known as lube oil flow improvers) can also be present in lubricant formulations of the present disclosure. Pour point depressant can be added to lower the minimum temperature at which the fluid will flow or can be poured. Examples of suitable pour point depressants include alkylated naphthalenes polymethacrylates, polyacrylates, polyarylamides, condensation products of haloparaffin waxes and aromatic compounds, vinyl carboxylate polymers, and terpolymers of dialkylfumarates, vinyl esters of fatty acids and allyl vinyl ethers. Such additives can be used in amount from 0 wt % to about 0.5 wt %, such as about 0.0001 wt % to about 0.3 wt %, such as about 0.001 wt % to about 0.1 wt %, based on the total weight of the lubricant formulation.

Corrosion Inhibitors/Metal Deactivators

Corrosion inhibitors can be included in lubricant formulations of the present disclosure. Corrosion inhibitors can be used to reduce the degradation of metallic parts that are in contact with the lubricant formulation. Suitable corrosion inhibitors include aryl thiazines, alkyl substituted dimercapto thiodiazoles, thiadiazoles and mixtures thereof. Such additives can be used in an amount of about 0.01 wt % to about 5 wt %, such as about 0.01 wt % to about 1.5 wt %, such as about 0.01 wt % to about 0.2 wt %, such as about 0.01 wt % to about 0.1 wt % based on the total weight of the lubricant formulation.

Seal Compatibility Additives

Seal compatibility agents help to swell elastomeric seals by causing a chemical reaction in the fluid or physical change in the elastomer. Suitable seal compatibility agents for use in lubricant formulations described herein include organic phosphates, aromatic esters, aromatic hydrocarbons, esters (butylbenzyl phthalate, for example), and polybutenyl succinic anhydride and sulfolane-type seal swell agents such as Lubrizol 730-type seal swell additives. Such additives can be used in an amount from about 0.01 wt % to about 3 wt %, such as about 0.01 wt % to about 2 wt % based on the total weight of the lubricant formulation.

Antifoam Agents

Antifoam agents can be included in lubricant formulations of the present disclosure. These agents can retard the formation of stable foams. Silicones and organic polymers are typical examples of antifoam agents. For example, polysiloxanes, such as silicon oil or polydimethyl siloxane, provide antifoam properties. Antifoam agents are commercially available and can be used in conventional minor amounts along with other additives such as demulsifiers; usually the amount of these additives combined is about 1 wt % or less, such as from about 0.001 wt % to about 0.5 wt %, such as from about 0.001 wt % to about 0.2 wt %, such as from about 0.001 wt % to about 0.15 wt % based on the total weight of the lubricant formulation. A non-limiting example of an antifoam agent is Foam Ban 149.

Inhibitors and Antirust Additives

Inhibitors and antirust additives can be included in lubricant formulations of the present disclosure. Anti-rust additives (or corrosion inhibitors) are additives that can protect lubricated metal surfaces against chemical attack by water or other contaminants. One type of anti-rust additive is a polar compound that wets the metal surface, protecting the metal surface with a film of oil. Another type of anti-rust additive absorbs water by incorporating it in a water-in-oil emulsion so that only the oil touches the metal surface. Yet another type of anti-rust additive chemically adheres to the metal to produce a non-reactive surface. Examples of suitable additives include zinc dithiophosphates, metal phenolates, basic metal sulfonates, fatty acids and amines. Other anti-wear additives include zinc dithiocarbamates, molybdenum dialkyldithiophosphates, molybdenum dithiocarbamates, other organo molybdenum-nitrogen complexes, sulfurized olefins, etc. Such additives can be used in an amount from about 0.01 wt % to about 5 wt %, such as from about 0.01 wt % to about 1.5 wt % based on the total weight of the lubricant formulation.

The term "organo molybdenum-nitrogen complexes" embraces the organo molybdenum-nitrogen complexes described in U.S. Pat. No. 4,889,647, which is fully incorporated herein by reference for US purposes. The complexes are reaction products of a fatty oil, dithanolamine and a molybdenum source. Specific chemical structures have not been assigned to the complexes. U.S. Pat. No. 4,889,647 reports an infrared spectrum for a typical reaction product of that disclosure; the spectrum identifies an ester carbonyl band at 1740 $cm^{-1}$ and an amide carbonyl band at 1620 $cm^{-1}$. The fatty oils are glyceryl esters of higher fatty acids containing at least 12 carbon atoms up to 22 carbon atoms or more. The molybdenum source is an oxygen-containing compound such as ammonium molybdates, molybdenum oxides and mixtures.

Other organo molybdenum complexes which can be used are tri-nuclear molybdenum-sulfur compounds described in EP 1 040 115 and WO 99/31113 and the molybdenum complexes described in U.S. Pat. No. 4,978,464, each of which is fully incorporated herein by reference for US purposes.

Additive packages useful in at least one embodiment of the present disclosure include the following non-limiting examples: HiTec™ 307, HiTec™ 317, and HiTec™ 3230, which contain antioxidants, friction modifiers, anti-wear, and/or extreme pressure additives.

Formulations of the present disclosure can be prepared by any suitable mixing process. Such mixing can consist of blending in a kettle with mixing device, or blending in an in-line mixing device (e.g. within pipe mixer). Blending can occur at elevated temperatures to aid the mixing process. The lubricant blend can also be filtered to remove any contaminants in the blend.

Properties of the Lubricant Formulations

In at least one embodiment, the lubricant formulations of the present disclosure can have one or more of the following characteristics:

(1) A kinematic viscosity at 40° C. (KV40, ASTM D445) that can be from about 1 cSt to about 6800 cSt, such as from about 5 cSt to about 4000 cSt, such as from about 10 cSt to about 3000 cSt, such as from about 15 cSt to about 2500 cSt, such as from about 25 cSt to about 2000 cSt, such as from about 32 cSt to about 1500 cSt, such as from about 100 cSt to about 680 cSt.

(2) A kinematic viscosity at 100° C. (KV100, ASTM D445) that can be from about 1 cSt to about 1500 cSt, such as from about 2 cSt to about 100 cSt, such as from about 3 cSt to about 50 cSt, such as from about 4 cSt to about 40 cSt.

(3) A viscosity index (ASTM D2270) that can be from about 79 to about 300, such as from about 80 to about 200, such as from about 90 to about 150, such as from about 100 to about 130.

(4) A pour point (ASTM D5950) that can be about 0° C. or less, such as about −20° C. or less, such as about −25° C. or less, such as about −35° C. or less, such as about −39° C. or less. In at least one embodiment, the pour point can be from about 0° C. to about −120° C., such as from about −20° C. to about −100° C., such as from about −39° C. to about −80° C.

(5) A Brookfield viscosity at 40° C. (ASTM D5293) that can be from about 1 cP to about 1,000,000 cP, such as about 700,000 cP or less, such as about 600,000 cP or less, such as about 500,000 cP or less, such as about 400,000 cSt or less.

(6) A foaming tendency (Sequence I, ASTM D892) in units of milliliters that can be from about 0/0 to about 300/300, such as from about 0/0 to about 5/5.

(7) A foaming tendency (Sequence II, ASTM D892) in units of milliliters that can be from about 0/0 to about 300/300, such as from about 0/0 to about 50/50, such as from about 0/0 to about 20/20.

(8) A foaming tendency (Sequence III, ASTM D892) in units of milliliters that can be from about 0/0 to about 300/300, such as from about 0/0 to about 50/50, such as from about 0/0 to about 20/20.

(9) An air release (65° C., ASTM D3427) that can be from about 0.1 min to about 300 min, such as from about 0.2 min to about 250 min, such as from about 0.4 min to about 200 min, such as from about 0.6 min to about 150 min, such as from about 0.8 min to about 100 min, such as from about 1 min to about 30 min.

An oxidative stability (312 hours, 95° C., ASTM D2893) in units of viscosity % increase that can be from about 0.01% to about 10%, such as from about 0.02% to about 5%, such as about 2% or less, such as about 1% or less, such as about 0.9% or less, such as about 0.8% or less, such as about 0.7% or less, such as about 0.6% or less, such as about 0.5% or less, such as about 0.4% or less, such as about 0.3% or less, such as about 0.2% or less, such as about 0.1% or less. In at least one embodiment, the oxidative stability (312 hours, 95° C.) can be from about 0% to about 1%.

(11) An oxidative stability (312 hours, 121° C., ASTM D2893) in units of viscosity % increase that can be from about 0% to about 10%, such as from about 0.01% to about 10%, such as from about 0.02% to about 5%, such as about 2% or less, such as about 1.5% or less, such as about 1.4% or less, such as about 1.3% or less, such as about 1.2% or less, such as about 1.1% or less, such as about 1% or less, such as about 0.9% or less, such as about 0.8% or less, such as about 0.7% or less, such as about 0.6% or less, such as about 0.5% or less, such as about 0.4% or less, such as about 0.3% or less, such as about 0.2% or less, such as about 0.1% or less. In at least one embodiment, the oxidative stability (312 hours, 121° C.) can be from about 0% to about 1.3%.

(12) A weld load (4-ball extreme pressure tester, weld point screen, ASTM D2783) that can be from 50 kilogram-force (kgf) to about 600 kgf, such as from about 75 kgf to about 500 kgf, such as from about 100 kgf to about 400 kgf, such as from about 150 kgf to about 300 kgf, such as from about 200 kgf to about 250 kgf.

(13) A total amount of solids dropout, as a measure of solubility, (measured in grams) that can be about 0.02 g or less, such as about 0.01 g or less, such as about 0.009 g or less, such as about 0.008 g or less, such as about 0.007 g or less, such as about 0.006 g or less, such as about 0.006 g or less, such as about 0.004 g or less, such as about 0.003 g or less, such as about 0.002 g or less, such as about 0.001 g or less. The procedure for measuring total amount of dropout is provided below.

Test Methods
Solubility

The following procedure is used to determine the total amount of solids dropout. An additive package (about 2.7 wt %) is mixed with a basestock or blend of basestocks until the additive package is fully dissolved. The samples are then stored in a refrigerator (temperature of 2.3° C.) for 3 weeks, and then left at room temperature for 12-18 hours or until the sample reaches room temperature. The samples are then filtered over a pre-weighed 10 micron filter paper to collect solids. The filter is dried and weighed again to quantify the total amount of solids dropout.

$^1$H NMR $^1$H NMR data of the alkylated aromatic compounds can be collected at 25° C. using a 5 mm tube on a 500 MHz Bruker spectrometer with deuterated chloroform (CDCl$_3$). Data was recorded for 96 scans with a relaxations delay of 1 s.

| Typical HV-AN Ratio Functional Group | Region (ppm) | Number of hydrogens per structure |
|---|---|---|
| Aromatic | 7-8 | ~8 |
| Olefinic | 4-6 | 0 |
| Aliphatic | 0.5-2 | 100 |

Embodiments Listing

The present disclosure provides, among others, the following embodiments, each of which may be considered as optionally including any alternate embodiments.

Clause 1. An alkylated aromatic compound having the structure

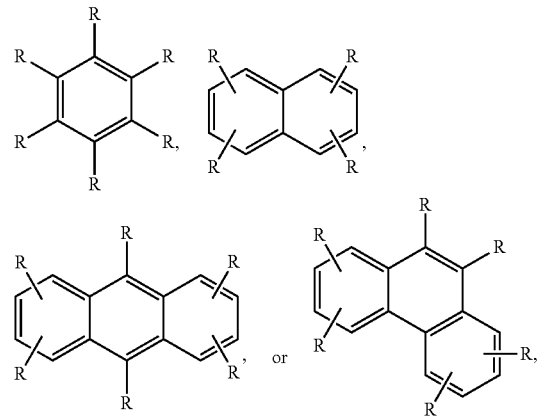

wherein:
at least one R group is a metallocene polyalphaolefin (mPAO); and
the remaining R groups, if any, are independently hydrogen, heteroatom, heteroatom containing group, an unsubstituted $C_1$-$C_{20}$ cyclic hydrocarbyl, substituted $C_1$-$C_{20}$ cyclic hydrocarbyl, unsubstituted $C_1$-$C_{20}$ acyclic hydrocarbyl, or substituted $C_1$-$C_{20}$ acyclic hydrocarbyl.

Clause 2. The alkylated aromatic compound of Clause 1, wherein the remaining R groups, if any, are hydrogen.

Clause 3. The alkylated aromatic compound of Clause 1 or Clause 2, wherein at least one R group is Br, Cl, F or I, —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)q-SiR*$_3$, and the like, where q is 1 to 10 and each R* is independently hydrogen, a hydrocarbyl or halocarbyl radical.

Clause 4. The alkylated aromatic compound of any one of Clauses 1-3 having the structure

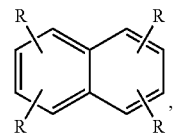

wherein at least one R group is a mPAO and the remaining R groups, if, are independently hydrogen, Br, Cl, F, I, —NR*$_2$, or —OR*, and each R* is independently hydrogen, a hydrocarbyl or halocarbyl radical.

Clause 5. The alkylated aromatic compound of any one of Clauses 1-4, wherein the mPAO has at least one of the following characteristics:
a kinematic viscosity at 40° C. (ASTM D445) from about 1 cSt to about 10,000 cSt, or from about 5 cSt to about 6,000 cSt, or from about 50 cSt to about 4,000 cSt;
a kinematic viscosity at 100° C. (ASTM D445) from about 1 cSt to about 7,500 cSt, or from about 3 cSt to about 1,000 cSt, or from about 10 cSt to about 500 cSt; or
a viscosity index (ASTM D2270) from about 50 to about 400, or from about 100 to about 300, or from about 130 to about 250.

Clause 6. The alkylated aromatic compound of any one of Clauses 1-5, wherein the alkylated aromatic compound has at least one of the following characteristics:
- a rotating pressure vessel oxidation test (RPVOT) (ASTM D2272) value from about 10 minutes to about 5000 minutes;
- a bromine number (ASTM D1159) of about 5 or less;
- a pour point (ASTM D97) of about 0° C. or less; or
- an aromatic content (ASTM D1840) from about 0.1 wt % to about 40 wt %.

Clause 7. The alkylated aromatic compound of any one of Clauses 1-6, wherein the alkylated aromatic compound has at least one of the following characteristics:
- is a rotating pressure vessel oxidation test (RPVOT) (ASTM D2272) value from about 30 minutes to about 2,000 minutes;
- a bromine number (ASTM D1159) of about 2 or less;
- a pour point (ASTM D97) of about −20° C. or less; or
- an aromatic content (ASTM D1840) from about 1 wt % to about 35 wt %.

Clause 8. The alkylated aromatic compound of any one of Clauses 1-7, wherein the alkylated aromatic compound has at least one of the following characteristics:
- a kinematic viscosity at 40° C. (KV40, ASTM D445) from about 60 cSt to about 5,000 cSt;
- a kinematic viscosity at 100° C. (KV100, ASTM D445) from about 10 cSt to about 500 cSt;
- a viscosity index (ASTM D2270) from about 70 to about 200;
- a rotating pressure vessel oxidation test (RPVOT) (ASTM D2272) value from about 70 minutes to about 500 minutes;
- a bromine number (ASTM D1159) of about 1 or less;
- a pour point (ASTM D97) of about −25° C. or less; or an aromatic content (ASTM D1840) from about 3 wt % to about 30 wt %.

Clause 9. The alkylated aromatic compound of any one of Clauses 1-8, wherein the alkylated aromatic compound has a kinematic viscosity at 40° C. (KV40, ASTM D445) from about 60 cSt to about 500 cSt, and a kinematic viscosity at 100° C. (KV100, ASTM D445) from about 10 cSt to about 40 cSt.

Clause 10. The alkylated aromatic compound of any one of Clauses 1-9, wherein the alkylated aromatic compound has a kinematic viscosity at 40° C. (KV40, ASTM D445) from about 400 cSt to about 5000 cSt and a kinematic viscosity at 100° C. (KV100, ASTM D445) from about 40 cSt to about 500 cSt.

Clause 11. A lubricant formulation, comprising:
- an alkylated aromatic compound of any one of Clauses 1-10.

Clause 12. The lubricant formulation of Clause 11, further comprising an additive selected from the group consisting of extreme pressure additives, solubility additives, friction modifiers, antifoam agent, dispersants, detergents, corrosion inhibitors, rust inhibitors, metal deactivators, anti-wear agents, anti-seizure agents, wax modifiers, viscosity index improvers, viscosity modifiers, fluid-loss additives, seal compatibility agents, lubricity agents, anti-staining agents, chromophoric agents, demulsifiers, emulsifiers, densifiers, wetting agents, gelling agents, tackiness agents, colorants, antioxidants, and a combination thereof.

Clause 13. The lubricant formulation of Clause 11 or 12, wherein the lubricant formulation comprises:
- from about 1 wt % to about 99.9 wt %, or from about 5 wt % to about 85 wt %, or from about 10 wt % to about 70 wt % of the alkylated aromatic compound based on a total weight of the lubricant formulation; and
- from about 0.1 wt % to about 12 wt %, or from about 0.5 wt % to about 5 wt %, or from about 1 wt % to about 3 wt % or from about 0.1 wt % to about 3 wt % of the additive, based on the total weight of the lubricant formulation, wherein the total weight of the alkylated aromatic compound and the additive does not exceed 100% of the lubricant formulation.

Clause 14. The lubricant formulation of Clause 12 or Clause 13, wherein the lubricant formulation comprises:
- from about 0.1 wt % to about 3 wt % of the additive based on a total weight of the lubricant formulation, wherein the total weight of the alkylated aromatic compound and the additive does not exceed 100% of the lubricant formulation.

Clause 15. The lubricant formulation of any one of Clauses 11-14, further comprising a Group I basestock, Group II basestock, Group III basestock, Group IV basestock, Group V basestock, or a combination thereof, the Group V basestock being different than the alkylated aromatic compound.

Clause 16. The lubricant formulation of Clause 15, wherein the lubricant formulation comprises:
- from about 1 wt % to about 99 wt %, or from about 5 wt % to about 80 wt % of the Group I basestock, Group II basestock, Group III basestock, Group IV basestock, Group V basestock, or a combination thereof, based on the total weight of the lubricant formulation,
- wherein the total weight of the alkylated aromatic compound, the additive, and the Group I basestock, Group II basestock, Group III basestock, Group IV basestock, Group V basestock, or a combination thereof, does not exceed 100% of the lubricant formulation.

Clause 17. The lubricant formulation of any one of Clauses 11-16, wherein the lubricant formulation has at least one of the following characteristics:
- a kinematic viscosity at 40° C. (KV40, ASTM D445) from about 15 cSt to about 2500 cSt, or from about 25 cSt to about 2000, or from about 32 cSt to about 1500 cSt, or from about 100 cSt to about 680 cSt;
- a kinematic viscosity at 100° C. (KV100, ASTM D445) from about 2 cSt to about 100 cSt, or from about 3 cSt to about 50 cSt, or from about 4 cSt to about 40 cSt;
- a viscosity index (ASTM D2270) from about 79 to about 300, or from about 80 to about 200, or from about 100 to about 130; or
- an oxidative stability (312 hours, 121° C., ASTM D2893) in units of viscosity % increase from about 0% to about 10%, or from about 0.02% to about 5%, or from about 0% to about 1.3%.

Clause 18. The lubricant formulation of any one of Clauses 11-17, wherein the lubricant formulation has at least one of the following characteristics:
- a kinematic viscosity at 40° C. (KV40, ASTM D445) from about 32 cSt to about 1500 cSt;
- a kinematic viscosity at 100° C. (KV100, ASTM D445) from about 3 cSt to about 50 cSt;
- a viscosity index (ASTM D2270) from about 80 to about 200; or
- an oxidative stability (312 hours, 121° C., ASTM D2893) in units of viscosity % increase from about 0.02% to about 5%.

Clause 19. A lubricant formulation, comprising:
- an alkylated aromatic compound of any one of Clauses 1-10, an additive; and optionally, a Group III basestock, Group IV basestock, Group V basestock, or a combination thereof, the Group V basestock being different than the alkylated aromatic compound.

Clause 20. The lubricant formulation of Clause 19, wherein the lubricant formulation comprises:

from about 1 wt % to about 99.9 wt %, or from about 5 wt % to about 85 wt %, or from about 10 wt % to about 70 wt % of the alkylated aromatic compound based on a total weight of the lubricant formulation; and from about 0.1 wt % to about 12 wt %, or from about 0.5 wt % to about 5 wt %, or from about 1 wt % to about 3 wt %, or from about 0.1 wt % to about 3 wt % of the additive, based on the total weight of the lubricant formulation, wherein the total weight of the alkylated aromatic compound and the additive does not exceed 100% of the lubricant formulation.

Clause 21. The lubricant formulation of Clause 19 or Clause 20, wherein the lubricant formulation comprises:

from about 1 wt % to about 99 wt %, or from about 5 wt % to about 80 wt % of the Group III basestock, Group IV basestock, Group V basestock, or a combination thereof, based on the total weight of the lubricant formulation, wherein the total weight of the alkylated aromatic compound, the additive, and Group III basestock, Group IV basestock, Group V basestock, or a combination thereof, does not exceed 100% of the lubricant formulation.

Clause 22. The lubricant formulation of any one of Clauses 19-21, wherein the lubricant formulation has at least one of the following characteristics:

a kinematic viscosity at 40° C. (KV40, ASTM D445) from about 15 cSt to about 2500 cSt, or from about 25 cSt to about 2000, or from about 32 cSt to about 1500 cSt, or from about 100 cSt to about 680 cSt;

a kinematic viscosity at 100° C. (KV100, ASTM D445) from about 2 cSt to about 100 cSt, or from about 3 cSt to about 50 cSt, or from about 4 cSt to about 40 cSt;

a viscosity index (ASTM D2270) from about 79 to about 300, or from about 80 to about 200, or from about 100 to about 130; or an oxidative stability (312 hours, 121° C., ASTM D2893) in units of viscosity % increase from about 0% to about 10%, or from about 0.02% to about 5%, or from about 0% to about 1.3%.

Clause 23 The lubricant formulation of any one of Clauses 19-22, wherein the lubricant formulation has at least one of the following characteristics:

a kinematic viscosity at 40° C. (KV40, ASTM D445) from about 32 cSt to about 1500 cSt;

a kinematic viscosity at 100° C. (KV100, ASTM D445) from about 3 cSt to about 50 cSt;

a viscosity index (ASTM D2270) from about 80 to about 200; or an oxidative stability (312 hours, 121° C., ASTM D2893) in units of viscosity % increase from about 0.02% to about 5%.

Clause 24. The lubricant formulation of any one of Clauses 11-23, wherein the lubricant formulation is a gear oil, compressor oil, hydraulic oil, grease, circulating fluid, engine oil, transmission fluid, axle fluid, driveline fluid, cooling fluid for electric vehicles, or a cooling fluid for electronics.

Clause 25. A method of forming a lubricant formulation comprising:

introducing a metallocene polyalphaolefin, an aromatic compound, and an acid catalyst to a reactor under reactor conditions to form the alkylated aromatic compound of any one of Clauses 1-10; and introducing the alkylated aromatic compound to an additive to form a lubricant formulation.

Clause 26. The method of Clause 25, wherein the acid catalyst is selected from the group consisting of triflic acid, $AlCl_3$, $BF_3$, Zeolite Beta, Zeolite Y, ZSM-5, ZSM-35, Amberlyst 15, or a combination thereof.

Clause 27. The method of Clause 25 or Clause 26, wherein the reactor conditions comprise:

a temperature from about −30° C. to about 350° C., or from about 0° C. to about 250° C., or from about 21° C. to about 200° C.; and a pressure from about 100 kPa to about 7000 kPa, or from about 100 kPa to about 1000 kPa, or from about 100 kPa to about 700 kPa.

Clause 28. The method of any one of Clauses 25-27, further comprising introducing a Group I basestock, Group II basestock, Group III basestock, Group IV basestock, Group V basestock, or a combination thereof, to the lubricant formulation.

Clause 29. The method of any one of Clauses 25-28, wherein the lubricant formulation is the lubricant formulation of any one of Clauses 11-24.

EXAMPLES

A. Example Synthesis of Alkylated Aromatic Compounds

In a reactor, naphthalene (6 wt %) is alkylated with a high viscosity unhydrogenated metallocene PAO (93.4 wt %) using about 0.6 wt % triflic acid (also known as trifluoromethanesulfonic acid) at 160° C. After about two to three hours, the reactor is cooled to about 70° C. and neutralized with 1% lime. The unreacted naphthalene is removed via distillation and the solution of the example alkylated naphthalene and lime is filtered over Celite to remove the lime.

B. Example Process for Preparing a Lubricant Formulation

The low viscosity base stocks listed in Table 3 (SpectraSyn™ 6 and Esterex™ A41 (if applicable)) were added to a continuously stirred mixing vessel and heat was added to bring the mixture temperature to 60 degrees Celsius. The additives were then slowly added to the mixture while mixing continued. The high viscosity base stocks (SpectraSyn Elite™ 150 and Ex. 1) were then added to the blend. Once all components were added, the blend was allowed to mix for at least 1 hour. The heater and mixer were then turned off and the blend was allowed to cool to room temperature before testing.

C. Results

Table 2 summarizes certain properties of the neat, example alkylated naphthalene basestocks. Ex. 1 is a high viscosity alkylated naphthalene (HV-AN) basestock and Ex. 2 is a medium viscosity alkylated naphthalene (MV-AN) basestock made according to some embodiments described herein. The comparative examples are SpectraSyn Elite™ 65 and SpectraSyn Elite™ 150, which are commercially available mPAO basestocks, and Synesstic™ 5 and Synesstic™ 12 which are commercially available low viscosity alkylated naphthalene basestocks made from linear alpha-olefins.

TABLE 2

|  |  |  |  | Comparative Examples | | | |
|---|---|---|---|---|---|---|---|
|  |  | Examples | | C.Ex. 1 | C.Ex. 2 | C.Ex. 3 | C.Ex. 4 |
| Property | Testing Method | Ex. 1 (HV-AN) | Ex. 2 (MV-AN) | (SpectraSyn Elite™ 65) | (SpectraSyn Elite™ 150) | (Synesstic™ 12) | (Synesstic™ 5) |
| Aromatic content, wt % | ASTM D1840 | 5.4 | 24 | 0 | 0 | 21 | 34 |
| Kinematic viscosity at 100° C., cSt | ASTM D445 | 115 | 21 | 65 | 150 | 13.31 | 4.71 |
| Kinematic viscosity at 40° C., cSt | ASTM D445 | 1623 | 244 | 600 | 2000 | 118.1 | 27.6 |
| Viscosity Index | ASTM D2270 | 163 | 106 | 183 | 195 | 108 | 81 |
| Pour Point, ° C. | ASTM D97 | −36 | −45 | −42 | −33 | −36 | −39 |
| RPVOT, min | ASTM D2272 | 144 | 246 | 30 | 30 | 172 | 283 |
| Bromine number, g/100 g | ASTM D1159 | <1 | 1.35 | <2 | <2 | <1 | <1.3 |

Numerical values in the table are modified by "about" or "approximately" the indicated value.

As indicated in Table 2, the example alkylated naphthalene basestocks Ex. 1 and Ex. 2 have high kinematic viscosities at both 40° C. and 100° C. and have a high viscosity index. Further, alkylated naphthalene basestocks Ex. 1 and Ex. 2 have unexpectedly higher oxidative stability (RPVOT values) based on the aromatic content of the alkylated naphthalenes. This outstanding RPVOT value may be a result of chemically attaching the polyalphaolefin and the alkylated naphthalene rather than blending the two. This unexpected oxidative stability is also shown in FIG. 1. There, the points on the dotted line represents comparative basestocks-both SpectraSyn Elite™ 65 and SpectraSyn Elite™ 150 having zero aromatic content and a RPVOT of about 30 min, Synesstic™ 12 with an aromatic content of about 21 wt % and a RPVOT of about 172 min, and Synesstic™ 5 having an aromatic content of about 34 wt % and a RPVOT of about 283 min. The example alkylated naphthalenes of the present disclosure are well above the line—Ex. 1 having an aromatic content of about 5.4 wt % and a RPVOT of about 144 min, and Ex. 2 having an aromatic content of about 24 wt % and a RPVOT of about 246 min. Table 2 further shows that these alkylated aromatic compounds have good pour points, e.g., below about −30° C., such as about −36° C. and about −45° C.

Figure 2:
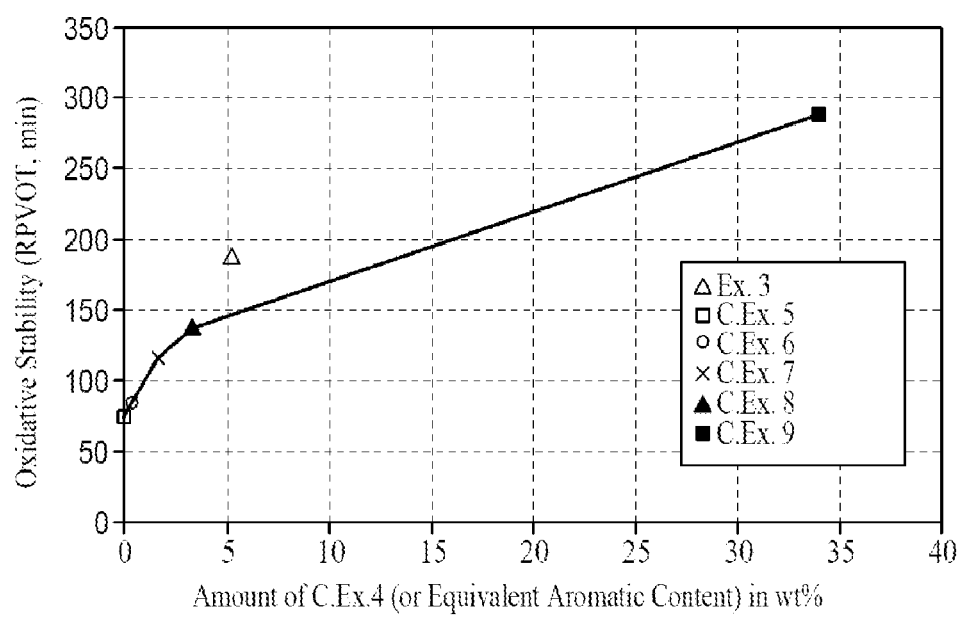
FIG. 2 is a graph of RPVOT values versus aromatic content of stabilized basestocks including an example high viscosity alkylated aromatic basestock and comparative blends of commercially available PAOs with lower viscosity aromatic basestocks according to at least one embodiment of the present disclosure.

FIG. 2 shows the oxidative stability of an Example 3, which is the example alkylated naphthalene basestock (Ex.1, HV-AN), with a stabilizer versus stabilized comparative blends C.Ex. 5, C.Ex. 6, C.Ex. 7, C.Ex. 8, C.Ex. 9. The comparative blends are stabilized blends of 0-100 wt % of alkylated naphthalene basestock (Synesstic™ 5, C.Ex. 4) in mPAO basestock (SpectraSyn Elite™ 150) and a stabilizer. This graph shows that the new alkylated aromatic compounds of the present disclosure have improved oxidative stability over blends of commercially available basestocks. This further shows that the formulations using the example basestocks described herein do not need an additional basestock to obtain improved solubility properties and oxidative stability and thus less materials can be used for formulations.

The low unsaturation number of the alkylated aromatic compounds, as evidenced by their low bromine number, can eliminate the need for conventional hydroprocessing operations (e.g., hydrofinishing operations) usually required for lubricant basestock production. This, along with not requiring an additional basestock or additive to improve the viscosity, oxidative stability, and solubility properties of the basestock and/or formulation, provides an additional advantage by further improving the overall economics of the lubricant. However, additional basestocks, additives, and/or an additional post-alkylation hydroprocessing operation may be used if desired.

Table 3 shows example formulations using the alkylated aromatic basestocks of the present disclosure (Example Formulations 1 and 2). Table 3 also shows a comparative formulation. SpectraSyn Elite™ 150 is a high viscosity mPAO having a kinematic viscosity (100° C.) of about 150 cSt, and SpectraSyn™ 6 is a conventional PAO having a kinematic viscosity (100° C.) of about 6 cSt. Esterex A41 is a Group V synthetic dibasic ester base oil based on diisodecyl adipate. The additive package includes an extreme pressure additive, a friction modifier, an antioxidant, antifoam agent, and a dispersant.

TABLE 3

| Component | Comparative Formulation | Example Formulation 1 | Example Formulation 2 |
|---|---|---|---|
| Ex. 1 (HV-AN) | — | 62.00 wt % | 66.00 wt % |
| SpectraSyn Elite™ 150 | 66.00 wt % | — | — |

TABLE 3-continued

|  | Comparative Formulation | Example Formulation 1 | Example Formulation 2 |
|---|---|---|---|
| SpectraSyn™ 6 | 21.67 wt % | 35.67 wt % | 21.67 wt % |
| Esterex A 41 | 10.00 wt % |  | 10.00 wt % |
| Additive Package | 2.33 wt % | 2.33 wt % | 2.33 wt % |
| Properties |  |  |  |
| 100° C. Kinematic Viscosity, cSt (ASTM D445) | 42 | 36 | 38 |
| 40° C. Kinematic Viscosity, cSt (ASTM D445) | 318 | 319 | 329 |
| Viscosity index (ASTM D2270) | 189 | 161.8 | 166 |
| Appearance (visual) | bright and clear | bright and clear | bright and clear |
| Pour point, ° C. (ASTM D5950) | −54 | −51 | −51 |
| Brookfield @ −40° C., cP (ASTM D5293) | 232200 | 461000 | 483000 |
| ASTM Foam Seq I, mL (ASTM D892) | 5/0 | 5/0 | 5/0 |
| ASTM Foam Seq II, mL (ASTM D892) | 10/0 | 20/0 | 10/0 |
| ASTM Foam Seq III, mL (ASTM D892) | 0/0 | 0/0 | 0/0 |
| Air release @ 65° C., min (ASTM D3427) | 3.3 | 23.2 | 30 min |
| Demulsability @ 82° C., min (ASTM D1401) | 43-37-0 (20 min) | 43-37-0 (20 min) | 41-37-2 (20 min) |
| Oxidation performance (312 h @ 95° C.), Viscosity increase, % change (ASTM D2893) | 0.99% | 0.83% | 0.81% |
| Oxidation performance (312 h @ 121° C.), Viscosity increase, % change (ASTM D2893) | 3.10% | 1.19% | 1.22% |
| 4-ball EP, weld point screen; Weld point, kgf (ASTM D2783) | 250 | 250 | 200 |

Numerical values in the table are modified by "about" or "approximately" the indicated value.

Table 3 demonstrates that the example formulations, having the new alkylated naphthalene compound, have improved oxidative stability. For example, while the comparative blend shows a percent viscosity increase of 0.99% when subjected to oxidation performance testing at 95° C., the example formulations show a significantly lower viscosity increase of only 0.83% and 0.81%. Moreover, while the comparative blend shows a percent viscosity increase of 3.10% when subjected to oxidation performance testing at 121° C., the example formulations show a dramatically lower viscosity increase of only 0.83% and 0.81%. These oxidative stability improvements allow formulators to further improve oxidative stability of their formulations to meet increasingly stringent industry specifications. For example a new standard, ISO 12925-1 was introduced in 2018 which had new oxidative stability performance requirements up to 150° C. The example formulations clearly demonstrate improved oxidative stability which will assist formulators in meeting such specifications.

Table 3 also demonstrates the solubility characteristics of the alkylated naphthalene. For example, the comparative formulation requires a solubility co-base stock (Esterex™ A41) to bring the formulation to appear bright and clear. Without the solubility co-base stock, the comparative formulation is cloudy and the additive package drops out. Example Formulation 1, surprisingly appears bright and clear even without the solubility additive. This is surprising because lubricant formulations generally require solubility co-base stock, such as esters to help solubilize the additive package.

The data demonstrate that the alkylated aromatic compounds of the present disclosure provide, at least, improved oxidative stability and solubility properties over conventional formulations. Additives to improve solubility and/or oxidation performance are not needed for the formulations. The viscosity measurements of the example formulations further show that the alkylated aromatic compounds of the present disclosure can be used as basestocks for high viscosity application.

Table 4 shows additional solubility data for the alkylated aromatic compounds of the present disclosure. Three basestocks or blends of basestocks were compared in a solubility test. The basestocks are detailed in Table 4. The three blends of basestocks were combined with ~2.7 wt % of an additive package (HiTec™ 307 available from Afton Chemical) and then mixed until the additive package was fully dissolved. The samples were then analyzed using ASTM method D1840 to evaluate the aromatic content. The samples were then stored in a refrigerator at 2.3° C. for 3 weeks, then left at room temperature for 12-18 hours. The samples were then filtered over a pre-weighed 10 micron filter paper to collect any solids. The filter was dried and weighed again to quantify the amount of solids dropout. Results are shown in Table 4.

Synesstic™ 5 is a commercially available alkylated naphthalene having a kinematic viscosity at 100° C. of about 5 cSt. SpectraSyn Elite™ 150 is a high viscosity mPAO having a kinematic viscosity (100° C.) of about 150 cSt. The basestock for Example Formulation 3 is 100% of alkylated naphthalene basestock Ex. 1 (described above), the basestock of Comparative Formulation 2 is a mixture of about 15% Synesstic™ 5 and about 85% SpectraSyn Elite™ 150, and the basestock of Comparative Formulation 3 is 100% SpectraSyn Elite™ 150. Aromatic content, in weight percent, was determined by ASTM D1840.

TABLE 4

| Basestock or Blends of Basestocks | | | | | Mass of |
|---|---|---|---|---|---|
| Ex. 1 (HV-AN) | Synesstic™ 5 | SpectraSyn Elite™ 150 | Additive Package | Aromatic Content | Solids Dropout |
| Example Formulation 3 | 100.25 g | — | — | 2.7 wt % | 5.32 wt % | 0.0031 g |
| Comparative Formulation 2 | — | 15.67 g | 84.8 g | 2.7 wt % | 5.32 wt % | 0.0022 g |
| Comparative Formulation 3 | — | — | 100.25 g | 2.7 wt % | 0 wt % | 0.0144 g |

Numerical values in the table are modified by "about" or "approximately" the indicated value.

Figure 3:
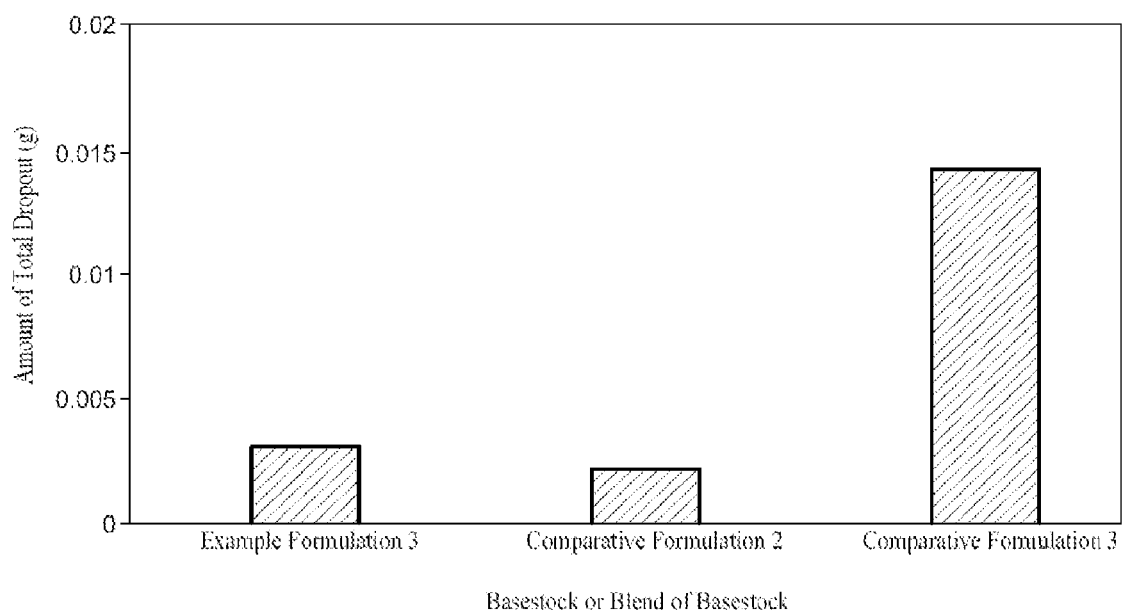
FIG. 3 shows a bar chart of the amount of solids dropout for comparative formulations and an example formulation according to at least one embodiment of the present disclosure.

Visually, Comparative Formulations 2 and 3 were cloudy and significant dropout was observed, while Example Formulation was bright and clear. In terms of solubility, Table 4 shows that alkylated aromatic compounds of the present disclosure are significantly better at solubilizing a conventional additive package than mPAO. For example, and as shown in FIG. 3, the mass of solids dropout for Example Formulation 3 is about 0.0031 g as compared to 0.0144 g for Comparative Formulation 3. Table 4 also shows that the alkylated aromatic compounds of the present disclosure are competitive with mixed basestocks having a combination of mPAO and alkylated naphthalene. For example, the mass of solids dropout for Example Formulation 3 is about 0.0031 g as compared to 0.0022 g for Comparative Formulation 2. However, to achieve such low solids dropout, Example Formulation 3 only uses a single basestock while Comparative Formulation requires a blend of two basestocks. Thus, the alkylated aromatic compounds of the present disclosure enable formulations to have less components than conventional basestocks while maintaining or improving the solubility of the basestock.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

What is claimed is:

1. A lubricant formulation, comprising an alkylated aromatic compound having the structure

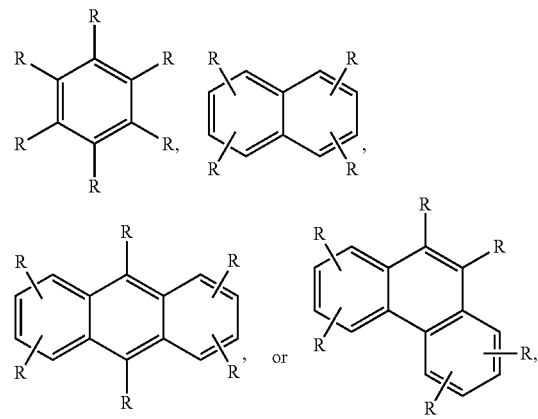

wherein:

at least one R group is a metallocene polyalphaolefin (mPAO); and the remaining R groups, if any, are independently hydrogen, heteroatom, heteroatom containing group, an unsubstituted $C_1$-$C_{20}$ cyclic hydrocarbyl, substituted $C_1$-$C_{20}$ cyclic hydrocarbyl, unsubstituted $C_1$-$C_{20}$ acyclic hydrocarbyl, or substituted $C_1$-$C_{20}$ acyclic hydrocarbyl;

wherein the alkylated aromatic compound is present in the lubricant formulation in an amount from 25 wt % to 95 wt %, based on a total weight of the lubricant formulation, and wherein the alkylated aromatic compound has a kinematic viscosity at 40° C. (KV40, ASTM D445) from about 60 cSt to about 500 cSt, and a kinematic viscosity at 100° C. (KV100, ASTM D445) from about 10 cSt to about 40 cSt.

2. The lubricant formulation of claim 1, wherein the remaining R groups, if any, are hydrogen.

3. The lubricant formulation of claim 1, wherein at least one R group is Br, Cl, F or I, —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)q-SiR*$_3$, and the like, where q is 1 to 10 and each R* is independently hydrogen, a hydrocarbyl or halocarbyl radical.

4. The lubricant formulation of claim 1 having the structure

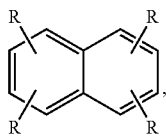

wherein at least one R group is a mPAO and the remaining R groups, if, are independently hydrogen, Br, Cl, F, I, —NR*$_2$, or —OR*, and each R* is independently hydrogen, a hydrocarbyl or halocarbyl radical.

5. The lubricant formulation of claim 1, wherein the mPAO has at least one of the following characteristics:
a kinematic viscosity at 40° C. (ASTM D445) from about 1 cSt to about 10,000 cSt;
a kinematic viscosity at 100° C. (ASTM D445) from about 1 cSt to about 7,500 cSt; or
a viscosity index (ASTM D2270) from about 50 to about 400.

6. The lubricant formulation of claim 1, wherein the alkylated aromatic compound has at least one of the following characteristics:
a rotating pressure vessel oxidation test (RPVOT) (ASTM D2272) value from about 10 minutes to about 5000 minutes;
a bromine number (ASTM D1159) of about 5 or less;
a pour point (ASTM D97) of about 0° C. or less; or
an aromatic content (ASTM D1840) from about 0.1 wt % to about 40 wt %.

7. The lubricant formulation of claim 1, wherein the alkylated aromatic compound has at least one of the following characteristics:
a rotating pressure vessel oxidation test (RPVOT) (ASTM D2272) value from about 30 minutes to about 2,000 minutes;
a bromine number (ASTM D1159) of about 2 or less;
a pour point (ASTM D97) of about −20° C. or less; or
an aromatic content (ASTM D1840) from about 1 wt % to about 35 wt %.

8. The lubricant formulation of claim 1, wherein the alkylated aromatic compound has at least one of the following characteristics:
a viscosity index (ASTM D2270) from about 70 to about 200;
a rotating pressure vessel oxidation test (RPVOT) (ASTM D2272) value from about 70 minutes to about 500 minutes;
a bromine number (ASTM D1159) of about 1 or less;
a pour point (ASTM D97) of about −25° C. or less; or
an aromatic content (ASTM D1840) from about 3 wt % to about 30 wt %.

9. A lubricant formulation, comprising:
the alkylated aromatic compound of claim 1; and
an additive, wherein the additive is present in the lubricant formulation in an amount from 0.1 wt % to 12 wt % based on the total weight of the lubricant formulation, wherein the total weight of the alkylated aromatic compound and the additive does not exceed 100% of the lubricant formulation.

10. The lubricant formulation of claim 9 wherein the additive is selected from the group consisting of extreme pressure additives, solubility additives, friction modifiers, antifoam agent, dispersants, detergents, corrosion inhibitors, rust inhibitors, metal deactivators, anti-wear agents, anti-seizure agents, wax modifiers, viscosity index improvers, viscosity modifiers, fluid-loss additives, seal compatibility agents, lubricity agents, anti-staining agents, chromophoric agents, demulsifiers, emulsifiers, densifiers, wetting agents, gelling agents, tackiness agents, colorants, antioxidants, and a combination thereof.

11. The lubricant formulation of claim 10, wherein the lubricant formulation comprises:
from about 0.1 wt % to about 3 wt % of the additive based on the total weight of the lubricant formulation.

12. The lubricant formulation of claim 9, further comprising a Group I basestock, Group II basestock, Group III basestock, Group IV basestock, Group V basestock, or a combination thereof, the Group V basestock being different than the alkylated aromatic compound.

13. The lubricant formulation of claim 12, wherein the lubricant formulation comprises:
from about 1 wt % to about 99 wt % of the Group I basestock, Group II basestock, Group III basestock, Group IV basestock, Group V basestock, or a combination thereof, based on the total weight of the lubricant formulation,
wherein the total weight of the alkylated aromatic compound, the additive, and the Group I basestock, Group II basestock, Group III basestock, Group IV basestock, Group V basestock, or a combination thereof, does not exceed 100% of the lubricant formulation.

14. The lubricant formulation of claim 9, wherein the lubricant formulation has at least one of the following characteristics:
a kinematic viscosity at 40° C. (KV40, ASTM D445) from about 15 cSt to about 2500 cSt;
a kinematic viscosity at 100° C. (KV100, ASTM D445) from about 2 cSt to about 100 cSt;
a viscosity index (ASTM D2270) from about 79 to about 300; or
an oxidative stability (312 hours, 121° C., ASTM D2893) in units of viscosity % increase from about 0% to about 10.

15. The lubricant formulation of claim 9, wherein the lubricant formulation has at least one of the following characteristics:
a kinematic viscosity at 40° C. (KV40, ASTM D445) from about 32 cSt to about 1500 cSt;
a kinematic viscosity at 100° C. (KV100, ASTM D445) from about 3 cSt to about 50 cSt;
a viscosity index (ASTM D2270) from about 80 to about 200; or
an oxidative stability (312 hours, 121° C., ASTM D2893) from about 0.02% to about 5%.

16. A lubricant formulation, comprising:
the alkylated aromatic compound of claim 1,
an additive; and
optionally, a Group III basestock, Group IV basestock, Group V basestock, or a combination thereof, the Group V basestock being different than the alkylated aromatic compound.

17. The lubricant formulation of claim 16, wherein the lubricant formulation comprises:
From about 25 wt % to about 95 wt % of the alkylated aromatic compound based on the total weight of the lubricant formulation; and
from about 0.1 wt % to about 12 wt % of the additive based on the total weight of the lubricant formulation, wherein the total weight of the alkylated aromatic compound and the additive does not exceed 100% of the lubricant formulation.

18. The lubricant formulation of claim 16, wherein the lubricant formulation comprises:

from about 1 wt % to about 99 wt % of the Group III basestock, Group IV basestock, Group V basestock, or a combination thereof, based on the total weight of the lubricant formulation,
wherein the total weight of the alkylated aromatic compound, the additive, and Group III basestock, Group IV basestock, Group V basestock, or a combination thereof, does not exceed 100% of the lubricant formulation.

19. The lubricant formulation of claim 16, wherein the lubricant formulation has at least one of the following characteristics:
a kinematic viscosity at 40° C. (KV40, ASTM D445) from about 15 cSt to about 2500 cSt;
a kinematic viscosity at 100° C. (KV100, ASTM D445) from about 2 cSt to about 100 cSt;
a viscosity index (ASTM D2270) from about 79 to about 300; or
an oxidative stability (312 hours, 121° C., ASTM D2893) in units of viscosity % increase from about 0% to about 10%.

20. The lubricant formulation of claim 16, wherein the lubricant formulation has at least one of the following characteristics:
a kinematic viscosity at 40° C. (KV40, ASTM D445) from about 32 cSt to about 1500 cSt;
a kinematic viscosity at 100° C. (KV100, ASTM D445) from about 3 cSt to about 50 cSt;
a viscosity index (ASTM D2270) from about 80 to about 200; or
an oxidative stability (312 hours, 121° C., ASTM D2893) in units of viscosity % increase from about 0.02% to about 5%.

21. The lubricant formulation of claim 1, wherein the lubricant formulation is a gear oil, compressor oil, hydraulic oil, grease, circulating fluid, engine oil, transmission fluid, axle fluid, driveline fluid, cooling fluid for electric vehicles, or a cooling fluid for electronics.

22. A method of forming the lubricant formulation comprising:
introducing the metallocene polyalphaolefin (mPAO), an aromatic compound, and an acid catalyst to a reactor under reactor conditions to form the alkylated aromatic compound of claim 1; and
introducing the alkylated aromatic compound to an additive to form the lubricant formulation, wherein the alkylated aromatic compound is present in the lubricant formulation in an amount from 25 wt % to 95 wt %, based on the total weight of the lubricant formulation.

23. The method of claim 22, wherein the acid catalyst is selected from the group consisting of triflic acid, $AlCl_3$, $BF_3$, Zeolite Beta, Zeolite Y, ZSM-5, ZSM-35, Amberlyst 15, or a combination thereof.

24. The method of claim 22, wherein the reactor conditions comprise:
a temperature from about −30° C. to about 350° C.; and
a pressure from about 100 kPa to about 7000 kPa.

25. The method of claim 22, further comprising introducing a Group I basestock, Group II basestock, Group III basestock, Group IV basestock, Group V basestock, or a combination thereof, to the lubricant formulation.

26. The method of claim 22, wherein the lubricant formulation is the lubricant formulation of claim 9.

27. An alkylated aromatic compound having the structure

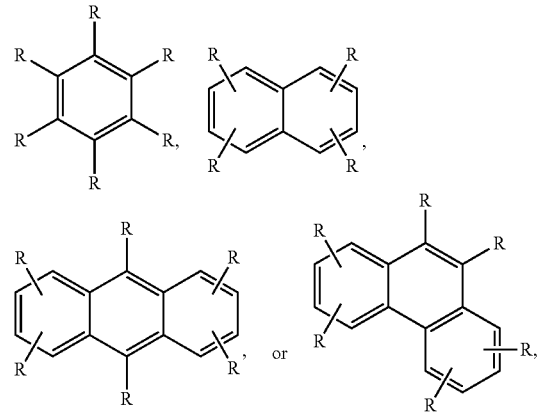

wherein:
at least one R group is a metallocene polyalphaolefin (mPAO); and
the remaining R groups, if any, are independently hydrogen, heteroatom, heteroatom containing group, an unsubstituted $C_1$-$C_{20}$ cyclic hydrocarbyl, substituted $C_1$-$C_{20}$ cyclic hydrocarbyl, unsubstituted $C_1$-$C_{20}$ acyclic hydrocarbyl, or substituted $C_1$-$C_{20}$ acyclic hydrocarbyl; and
wherein the alkylated aromatic compound has a kinematic viscosity at 40° C. (KV40, ASTM D445) from about 60 cSt to about 500 cSt, and a kinematic viscosity at 100° C. (KV100, ASTM D445) from about 10 cSt to about 40 cSt.

* * * * *